(12) United States Patent
Walsh et al.

(10) Patent No.: US 12,215,855 B2
(45) Date of Patent: Feb. 4, 2025

(54) LED GROWTH LIGHT

(71) Applicant: ABUNDANT LIGHTING TECHNOLOGY, LLC, Grand Rapids, MI (US)

(72) Inventors: John M. Walsh, Grand Rapids, MI (US); Joel T. Pyper, Holland, MI (US); Nathan A. Fortier, Grandville, MI (US); Luke Fritz, Grand Rapids, MI (US); Michael Thomas, Lake Orion, MI (US); Mark Gage, Granger, IN (US)

(73) Assignee: ABUNDANT LIGHTING TECHNOLOGY, LLC, Grand Rapids, MI (US)

( * ) Notice: Subject to any disclaimer, the term of this patent is extended or adjusted under 35 U.S.C. 154(b) by 6 days.

(21) Appl. No.: 18/222,514

(22) Filed: Jul. 17, 2023

(65) Prior Publication Data

US 2024/0023492 A1 Jan. 25, 2024

Related U.S. Application Data

(60) Provisional application No. 63/390,814, filed on Jul. 20, 2022.

(51) Int. Cl.
| | | |
|---|---|---|
| *F21V 7/00* | (2006.01) | |
| *F21V 23/00* | (2015.01) | |
| *F21Y 105/16* | (2016.01) | |
| *F21Y 115/10* | (2016.01) | |

(52) U.S. Cl.
CPC ............ *F21V 7/005* (2013.01); *F21V 23/008* (2013.01); *F21V 23/002* (2013.01); *F21Y 2105/16* (2016.08); *F21Y 2115/10* (2016.08)

(58) Field of Classification Search
CPC ...... F21V 7/005; F21V 23/008; F21V 23/002; F21Y 2115/10
See application file for complete search history.

(56) References Cited

U.S. PATENT DOCUMENTS

| | | | |
|---|---|---|---|
| 5,012,395 A | 4/1991 | Wettengel et al. | |
| 5,012,609 A | 5/1991 | Ignatius et al. | |
| 6,561,690 B2* | 5/2003 | Balestriero | ............. F21V 29/87 |
| | | | 362/240 |
| 8,297,782 B2 | 10/2012 | Bafetti et al. | |
| 8,376,579 B2* | 2/2013 | Chang | ..................... F21V 13/04 |
| | | | 362/225 |
| 8,453,376 B2 | 6/2013 | Chen et al. | |
| 8,523,385 B2 | 9/2013 | Lu et al. | |

(Continued)

FOREIGN PATENT DOCUMENTS

GB 2548695 9/2017

OTHER PUBLICATIONS

US 9,419,144 B2, 08/2016, BeVier et al. (withdrawn)

*Primary Examiner* — Evan P Dzierzynski
(74) *Attorney, Agent, or Firm* — PRICE HENEVELD LLP

(57) ABSTRACT

An LED growth light and method for providing light to plants incorporating a reflector housing, LED driver, and dimmable rows of LED chips on the LED growth light. The reflector housings couple to a wiring compartment that includes wiring coupled to each row of LED chips on each reflector housing. The LED driver is coupled to an exterior groove in between two adjacent reflector housings.

20 Claims, 27 Drawing Sheets

(56) References Cited

U.S. PATENT DOCUMENTS

| | | |
|---|---|---|
| 8,549,787 B2 | 10/2013 | Aikala |
| 8,738,160 B2 | 5/2014 | Bucove et al. |
| 8,850,743 B2 | 10/2014 | Aikala |
| 8,882,291 B1 | 11/2014 | Bourget et al. |
| 9,060,468 B2 | 6/2015 | Klase et al. |
| 9,137,874 B2 | 9/2015 | Maxik et al. |
| 9,185,852 B2 | 11/2015 | Aikala et al. |
| 9,232,700 B2 | 1/2016 | Aikala et al. |
| 9,282,698 B2 | 3/2016 | Beyer |
| 9,303,825 B2 | 4/2016 | Boomgaarden et al. |
| 9,310,027 B2 | 4/2016 | Wells |
| 9,310,049 B2 | 4/2016 | Wells |
| 9,318,648 B2 | 4/2016 | Aikala et al. |
| 9,408,275 B2 | 8/2016 | Maxik et al. |
| 9,450,144 B2 | 9/2016 | Aikala et al. |
| 9,456,556 B2 | 10/2016 | Aikala et al. |
| 9,485,920 B2 | 11/2016 | Aikala et al. |
| 9,516,818 B2 | 12/2016 | Aikala |
| 9,541,261 B2 | 1/2017 | Klase et al. |
| 9,666,769 B2 | 5/2017 | Osaki et al. |
| 9,681,515 B2 | 6/2017 | Rantala |
| 9,750,105 B2 | 8/2017 | Rantala |
| 9,788,387 B2 | 10/2017 | Soler et al. |
| D804,077 S * | 11/2017 | Ma ................................. D26/76 |
| 9,820,447 B2 | 11/2017 | Vilgiate |
| 9,844,116 B2 | 12/2017 | Soler et al. |
| 9,854,749 B2 | 1/2018 | Klase et al. |
| 9,872,357 B1 | 1/2018 | Aikala |
| 9,883,635 B2 | 2/2018 | Aikala et al. |
| 9,951,941 B2 | 4/2018 | Klase et al. |
| 9,961,841 B2 | 5/2018 | Aikala et al. |
| D822,881 S | 7/2018 | Drew et al. |
| 10,222,052 B1 | 3/2019 | Ter-Hovhannisyan |
| 10,920,940 B1 * | 2/2021 | Bryan ....................... F21V 5/04 |
| 2004/0120152 A1 | 6/2004 | Bolta et al. |
| 2005/0041417 A1 | 2/2005 | Mackin |
| 2007/0047229 A1 * | 3/2007 | Lee ........................ F21V 15/013 362/240 |
| 2007/0291420 A1 | 12/2007 | Chen |
| 2010/0103664 A1 | 4/2010 | Simon et al. |
| 2010/0284195 A1 | 11/2010 | Chen et al. |
| 2011/0149548 A1 * | 6/2011 | Yang ..................... F21V 15/013 362/217.1 |
| 2011/0266282 A1 | 11/2011 | Chu |
| 2013/0039051 A1 * | 2/2013 | Wu ........................ F21V 29/70 362/218 |
| 2015/0128488 A1 | 5/2015 | Casper et al. |
| 2015/0223403 A1 | 8/2015 | Aikala et al. |
| 2017/0000041 A1 | 1/2017 | Wargent |
| 2018/0014374 A1 | 1/2018 | Rhodes et al. |
| 2018/0054974 A1 | 3/2018 | Vasilenko |
| 2018/0070421 A1 | 3/2018 | Soler et al. |
| 2018/0070537 A1 | 3/2018 | Vasilenko |
| 2018/0177017 A1 | 6/2018 | Soler et al. |
| 2022/0154922 A1 * | 5/2022 | Cai ........................ A01G 7/045 |
| 2023/0003369 A1 * | 1/2023 | Goettle .................... F21V 14/02 |

* cited by examiner

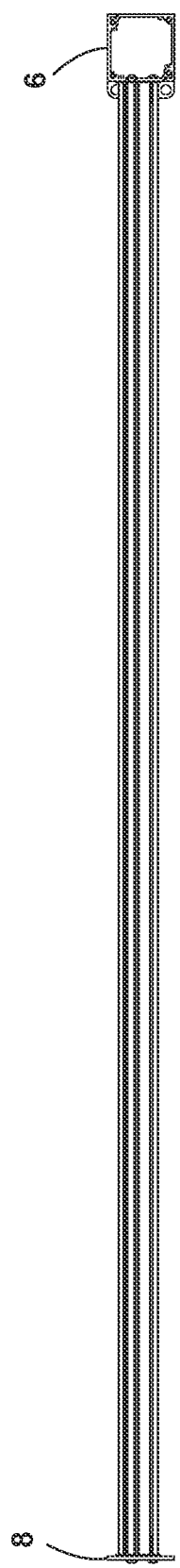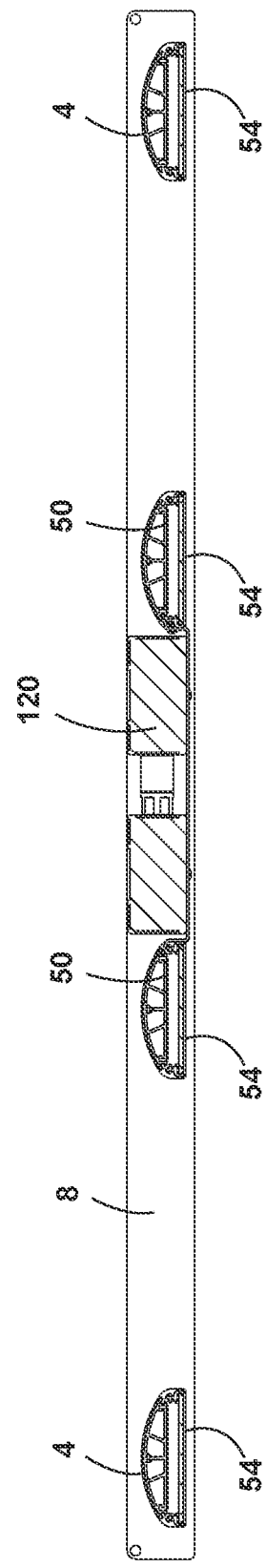
FIG. 25
FIG. 26

LED GROWTH LIGHT

CROSS REFERENCE TO RELATED APPLICATION

The present application claims the priority benefits under the provisions of 35 U.S.C. § 119, basing said claim of priority on related U.S. Provisional Application No. 63/390,814 filed Jul. 20, 2022, which is incorporated in its entirety herein by reference.

BACKGROUND OF THE INVENTION

The present invention relates to the field of growing plants. More specifically, the present invention relates to Light Emitting Diode (LED) growth lights for growing plants.

Artificial lights for growing plants are known in the art. These artificial lights can be used to supplement natural light or even used in lieu of natural light. Plants are able to capture light energy and use it to promote plant growth. Prior art plant growth lights include, among other things, high pressure sodium or fluorescent style lamps. However, these growth lights can generate heat that could harm the plants, require significant electricity, require frequent bulb replacement, and are generally limited in the scope of wave lengths of light which could be provided to the plants.

While such prior growth lights have been proven to be generally successful, further improvements and enhancements to the same, would be advantageous and are described herein.

SUMMARY OF THE INVENTION

One object of the present invention is a growth light. The growth light has at least two reflector housings. The reflector housings include a convex upper surface, an opening in a lower surface, a lens support surface adjacent to said opening, a plurality of ridges extending between the convex upper surface and a printed circuit board support surface. The reflector housing has at least one exterior groove is located on a side surface of the reflector housing, and at least one fastener opening on the front surface. An LED driver is coupled between the at least one exterior groove of two adjacent reflector housings. The growth light includes a wiring compartment having an internal cavity. The wiring compartment has at least one fastener opening that aligns with the at least one fastener opening on the front surface of the reflector housing. At least one fastener is coupled from the internal cavity of the wiring compartment through the aligned at least one fastener openings on the front surface of the reflector housing and the wiring compartment. The growth light includes a multi-channel printed circuit board with at least two channels of LED chips arranged on the printed circuit board. The printed circuit board is coupled to the printed circuit board support surface of the reflector housing.

Another aspect of the present invention is an LED light. The LED light has at least two reflector housings. The reflector housings include a convex upper surface, an opening in a lower surface, a lens support surface adjacent to said opening, at least one exterior groove on a side surface of the reflector housing, and at least one fastener opening on the front surface. An LED driver is coupled between at least one exterior groove of two adjacent reflector housings. The LED light includes a wiring compartment having an internal cavity. The wiring compartment has at least one fastener opening that aligns with the at least one fastener opening on the front surface of the reflector housing. At least one fastener is coupled from the internal cavity of the wiring compartment through the aligned at least one fastener openings on the front surface of the reflector housing and the wiring compartment. The LED light includes a multi-channel printed circuit board with at least two channels of LED chips arranged on the printed circuit board. The printed circuit board is positioned on the reflector housing.

Yet another aspect of the present invention is an LED growth light. The LED growth light has at least two reflector housings. The reflector housings include a convex upper surface, an opening in a lower surface, a lens support surface adjacent to the opening, at least one exterior groove on a side surface of the reflector housing, and at least one fastener opening on the front surface and rear surface. An LED driver is coupled between the at least one exterior groove of two adjacent reflector housings. The LED growth light has a wiring compartment having an internal cavity, including at least one fastener opening that aligns with the at least one fastener opening on the front surface of the reflector housing. At least one fastener is coupled from the internal cavity of the wiring compartment through the aligned at least one fastener openings on the front surface of the reflector housing and the wiring compartment. The LED growth light includes a multi-channel printed circuit board with at least two channels of LED chips arranged on the printed circuit board. The printed circuit board is positioned in the reflector housing.

These and other advantages of the invention will be further understood and appreciated by those skilled in the art by reference to the following written specification, claims, and appended drawings.

BRIEF DESCRIPTION OF THE DRAWINGS

In the drawings:

FIG. 25 is a side cross-sectional view of the LED growth light shown in FIG. 20;

FIG. 26 is a cross-sectional view of the LED growth light shown in FIG. 20;

DETAILED DESCRIPTION OF THE PREFERRED EMBODIMENTS

Figure 1:
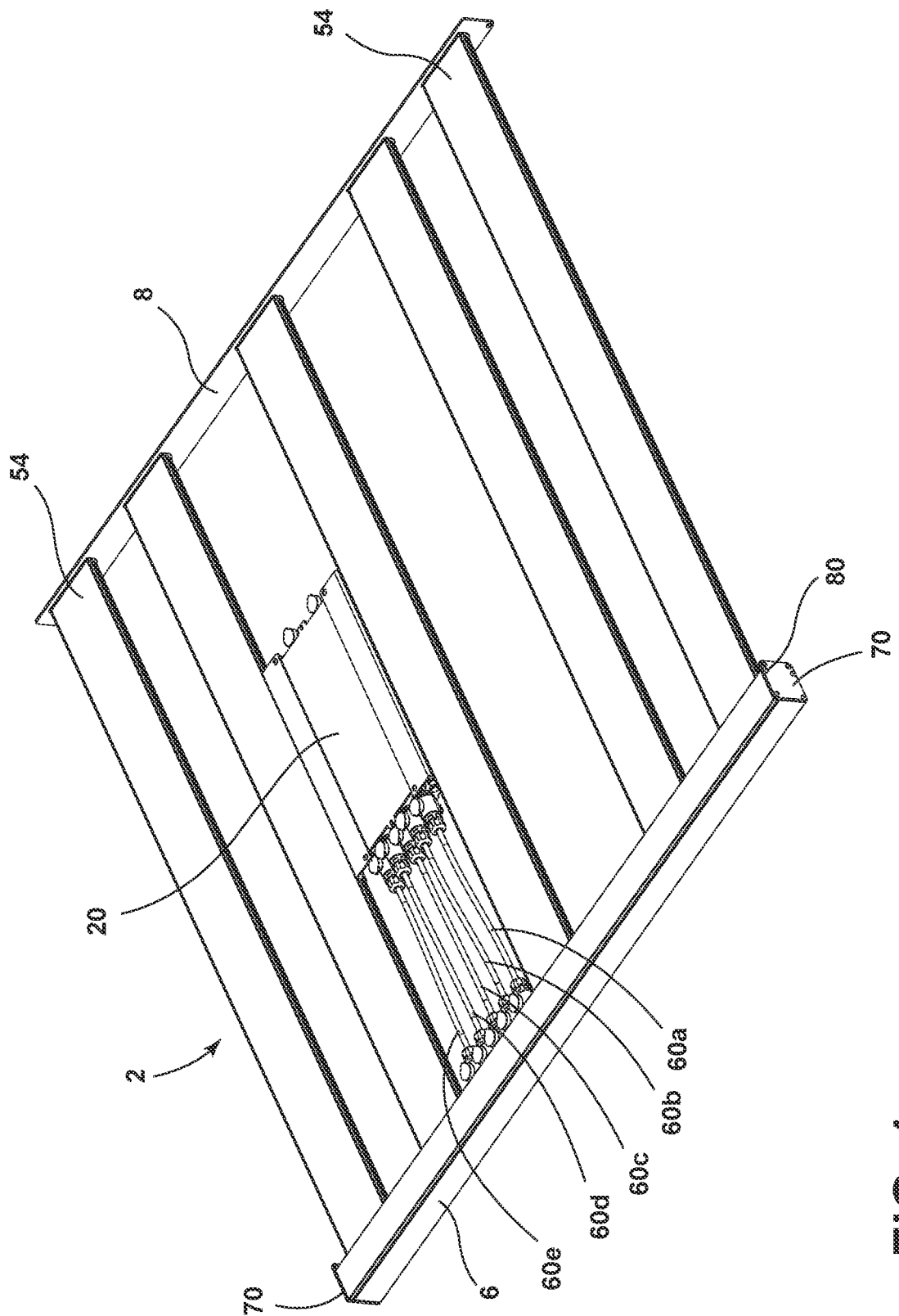
FIG. 1 is a bottom perspective view of an LED growth light according to one embodiment of the invention.
Figure 2:
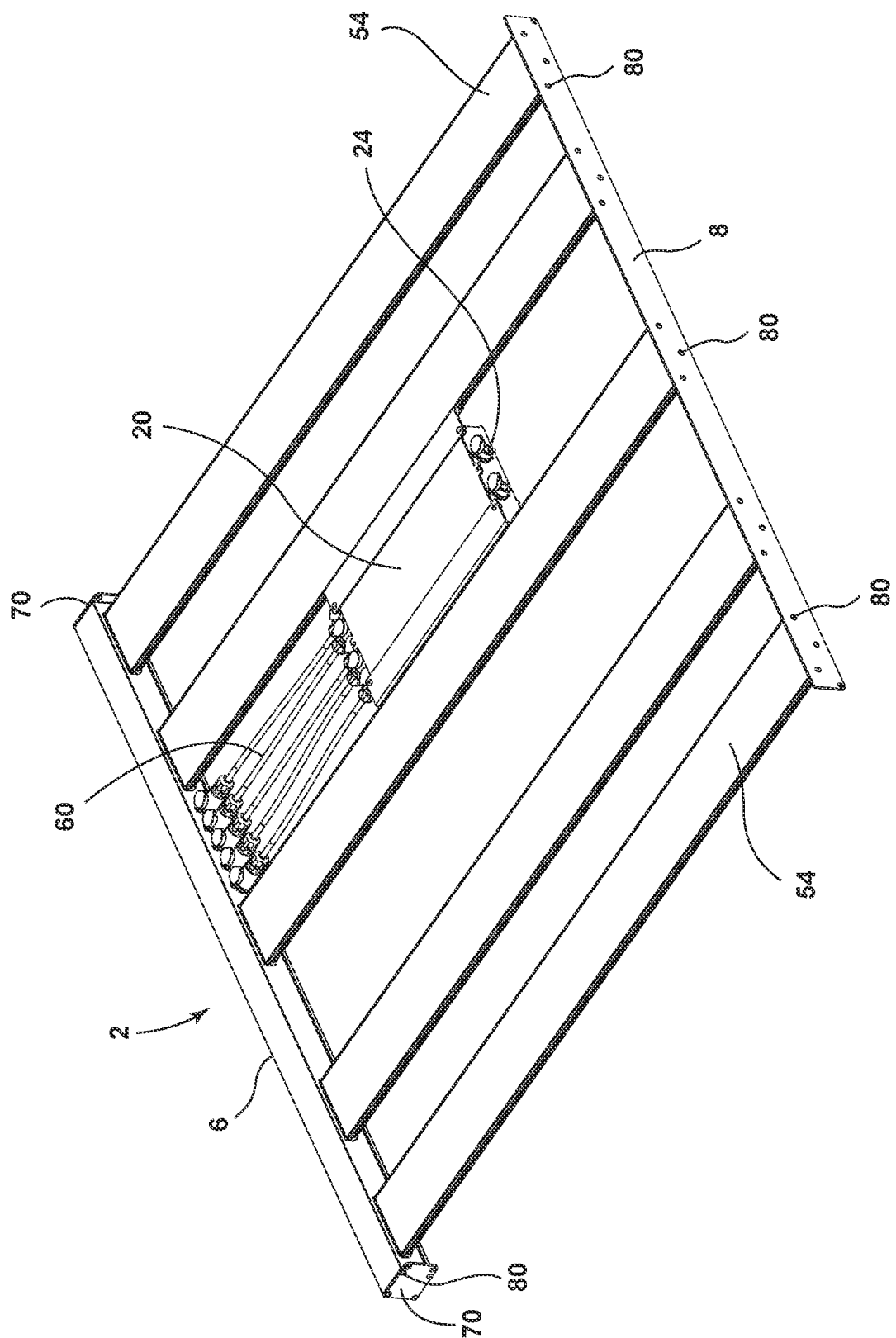
FIG. 2 is a rotated bottom perspective view of the LED growth light shown in FIG. 1.
Figure 3:
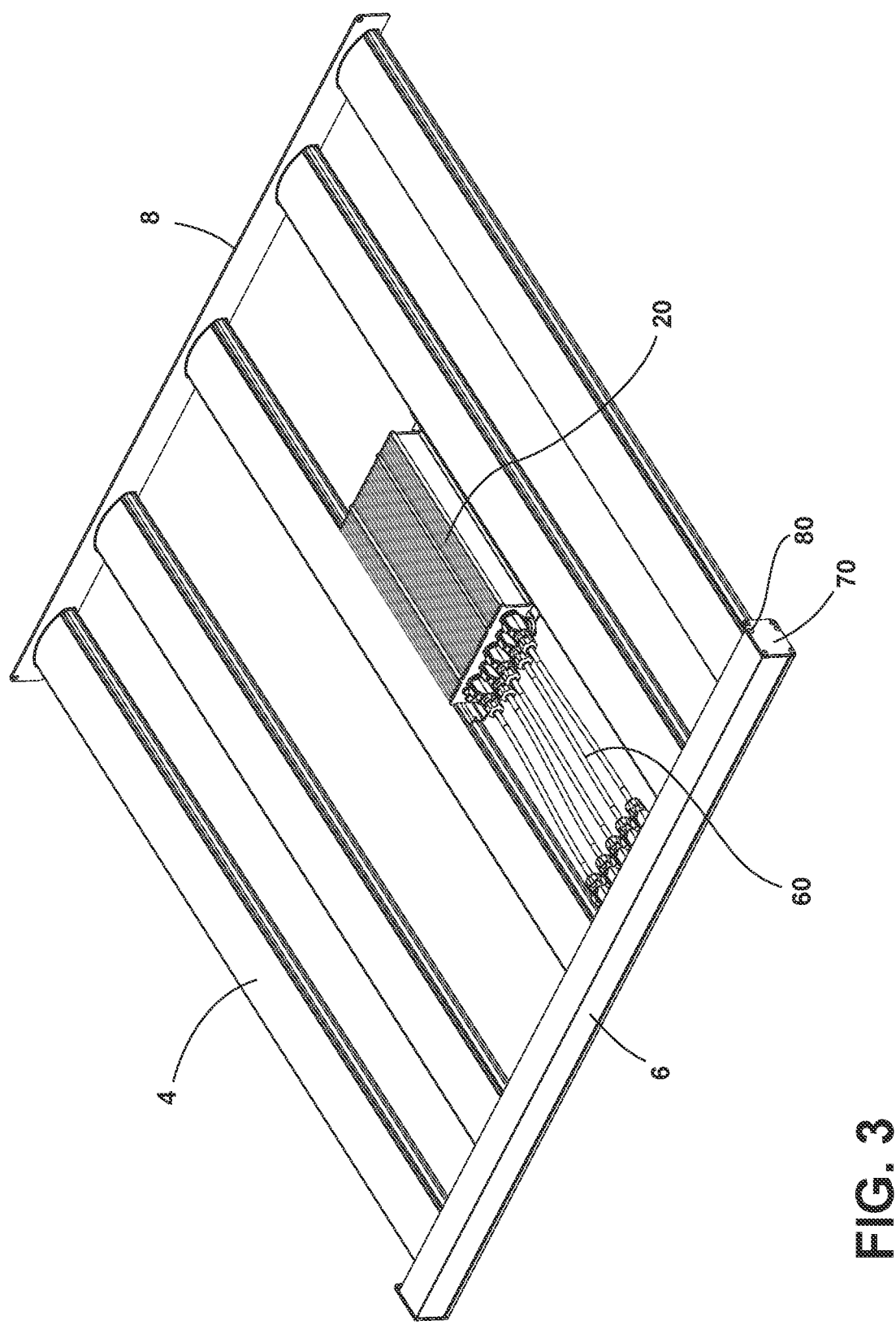
FIG. 3 is a top perspective view of the LED growth light shown in FIG. 1.
Figure 4:
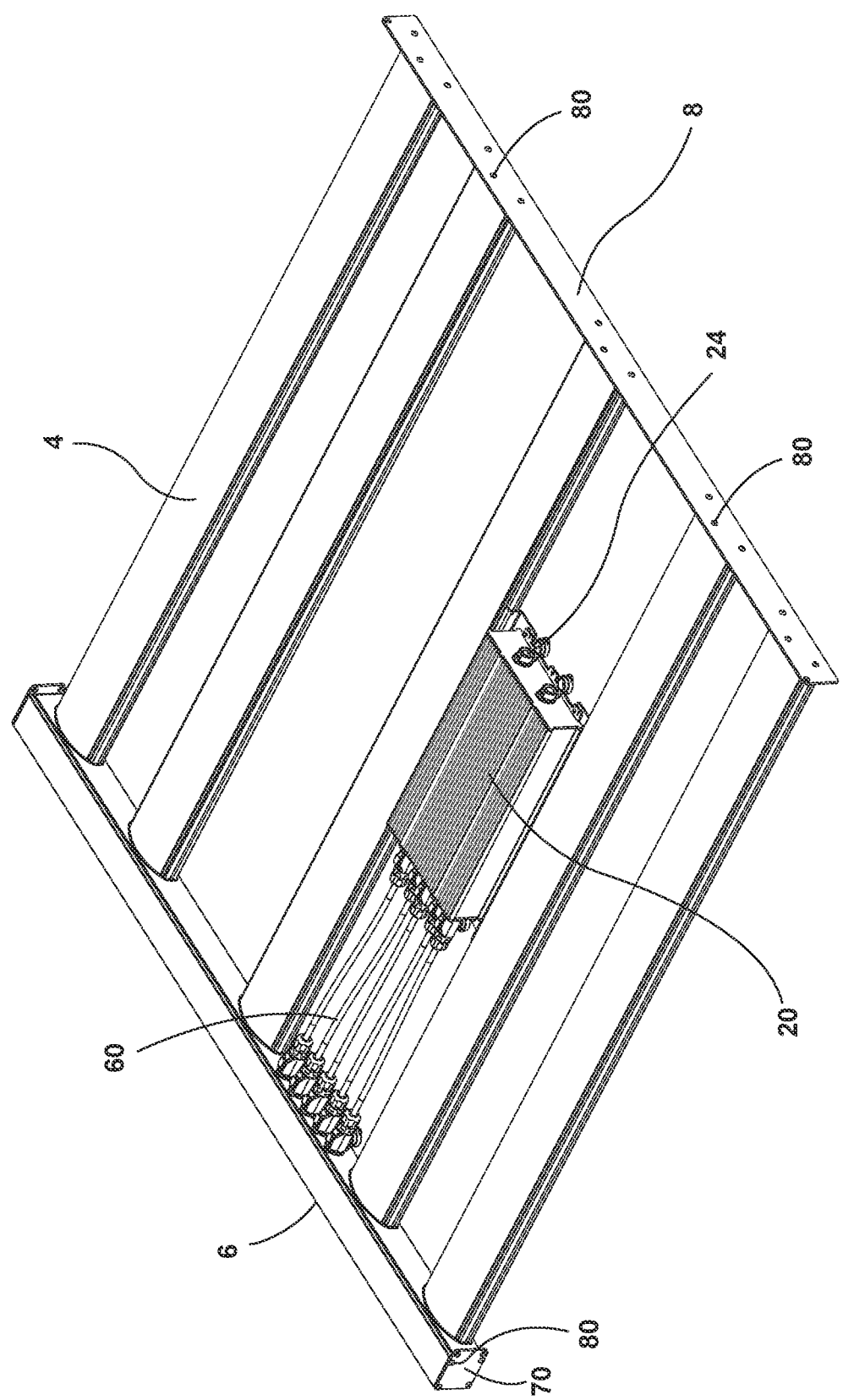
FIG. 4 is a rotated top perspective view of the LED growth light shown in FIG. 1.
Figure 5:
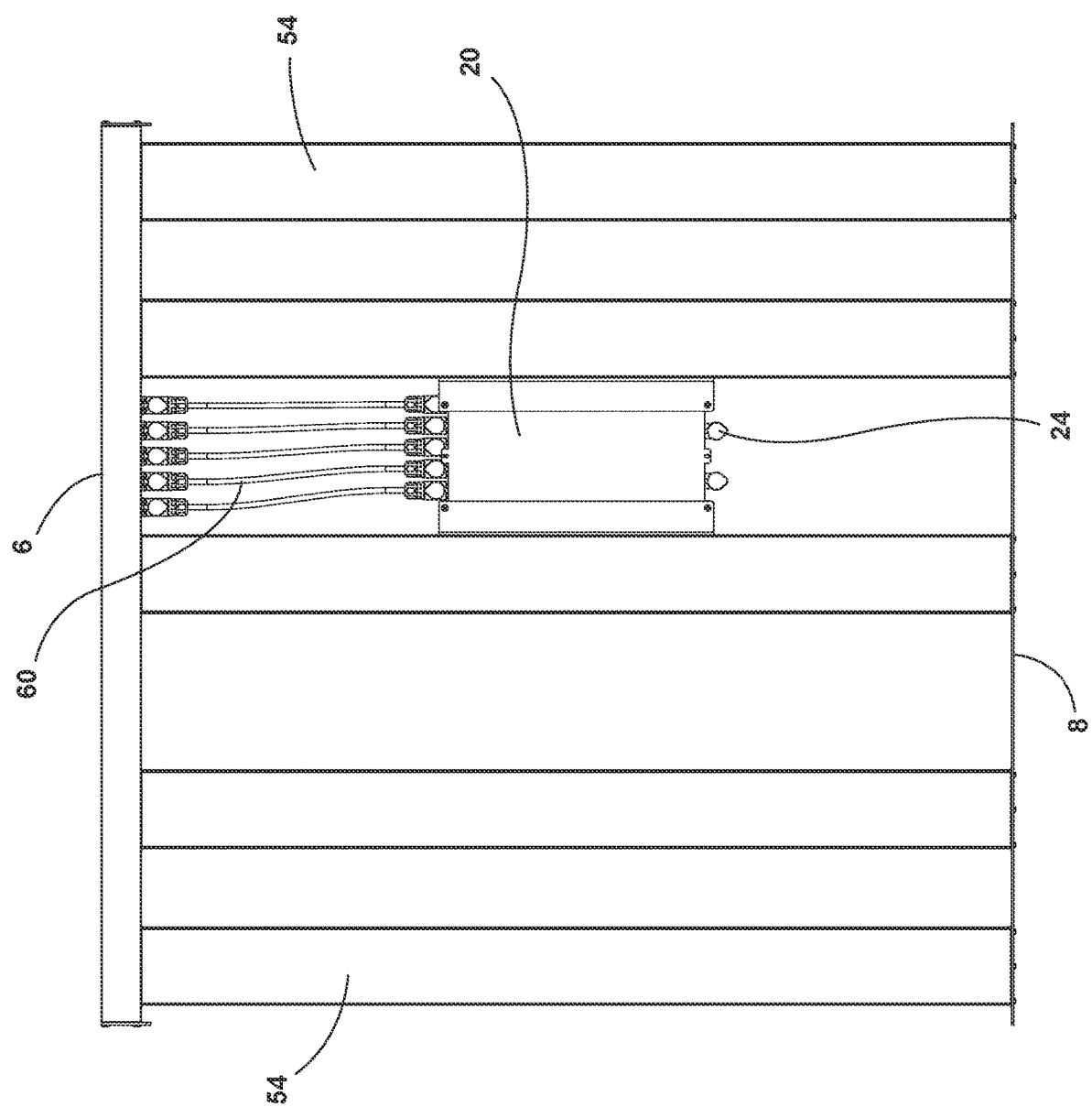
FIG. 5 is a bottom view of the LED growth light shown in FIG. 1.
Figure 6:
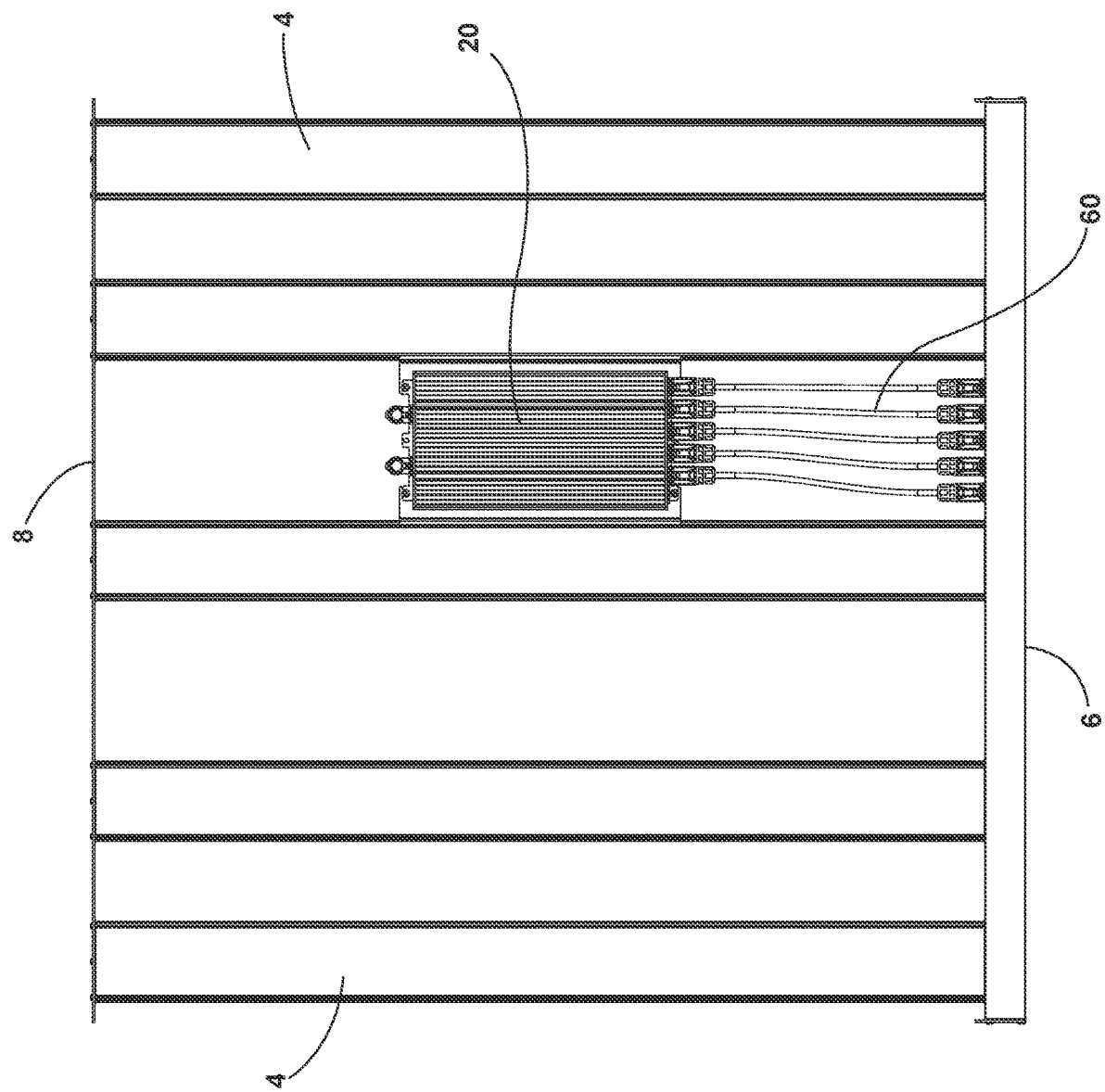
FIG. 6 is a top view of the LED growth light shown in FIG. 1.
Figure 7:
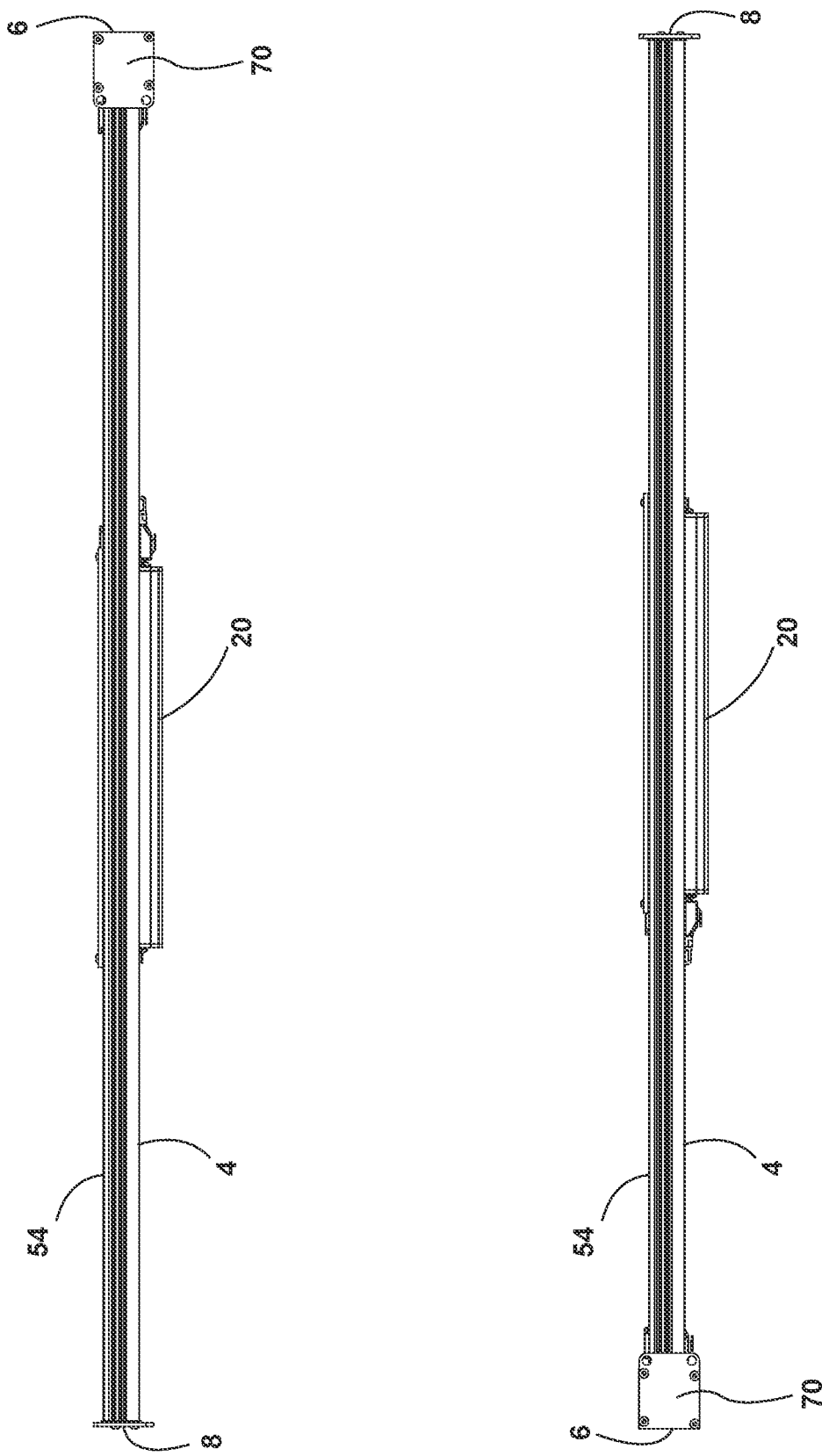
FIG. 7 illustrates side views of the LED growth light shown in FIG. 1.
Figure 8:
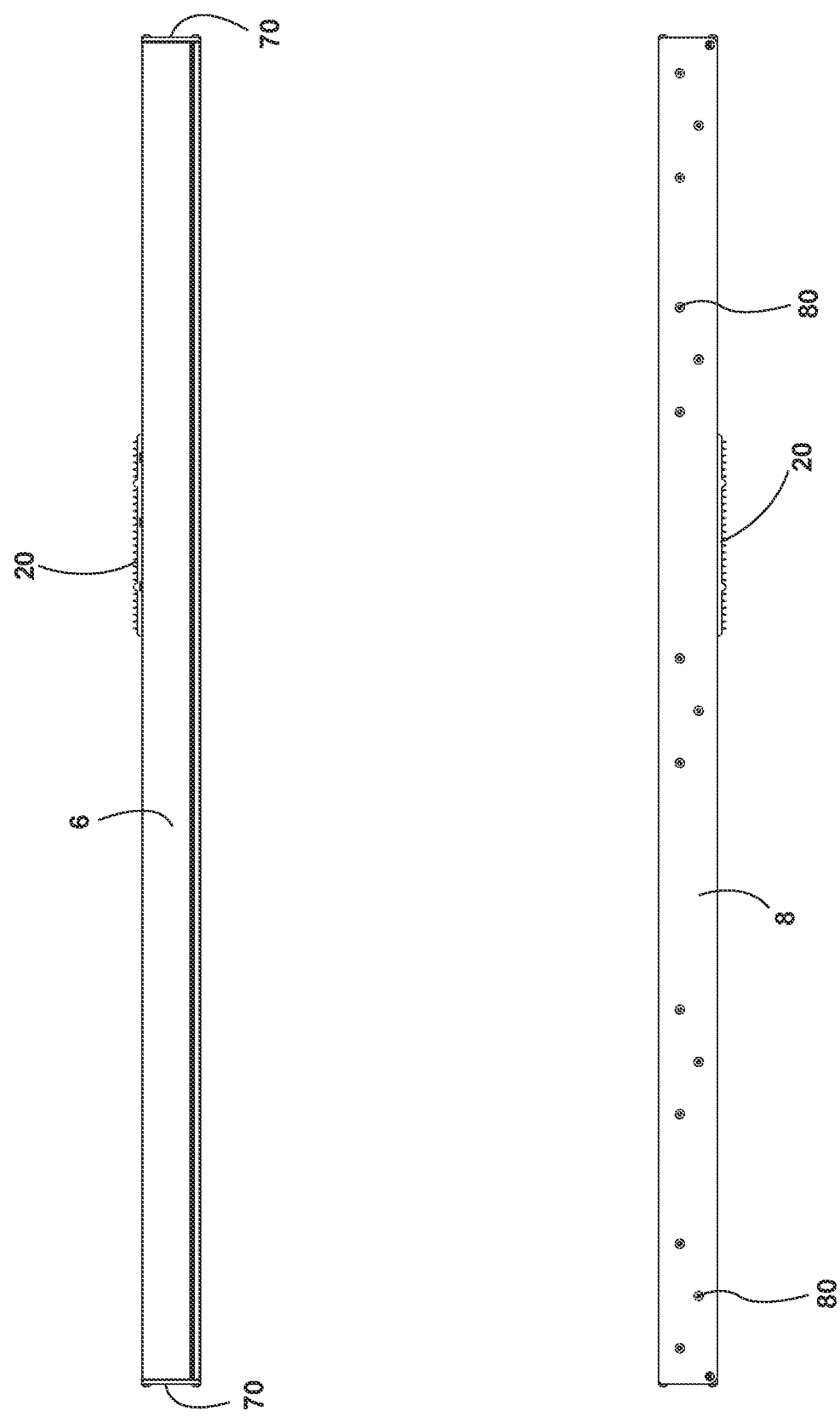
FIG. 8 illustrates front and back views of the LED growth light shown in FIG. 1.

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An embodiment of LED growth light 2 is illustrated in FIGS. 1-10. The LED growth light 2 has a number of reflector housings 4. In the embodiment illustrated in FIGS. 1-10, the LED growth light 2 has five spaced apart reflector housings 4. While five reflector housings 4 are illustrated in the embodiment shown in FIGS. 1-10, any number of two or more reflector housings 4 can be utilized. The LED growth light 2 also includes an LED driver 20. In the illustrated embodiment, the LED driver 20 is coupled in between two adjacent reflector housings 4 that are located near the center of the LED growth light 2. The LED driver 20 can be coupled closer to the front, back, or at either end of the LED growth light 2. The LED growth light 2 also has a wiring compartment 6 that has an internal cavity 77. The LED growth light 2 includes a plate 8 that is disposed opposite the wiring compartment 6 such that the reflector housings 4 are coupled in between one wall of the wiring compartment 6 and the plate 8.

The reflector housings 4 include a convex upper surface 15 and an opening 21 in the lower surface. A lens support surface 17 is adjacent to the opening. In addition, one or more ridges 11 extend between the convex upper surface 15 and the printed circuit board supports 111. The ridges 11 can increase thermal conduction away from the printed circuit board (PCB) 50.

Figure 17:
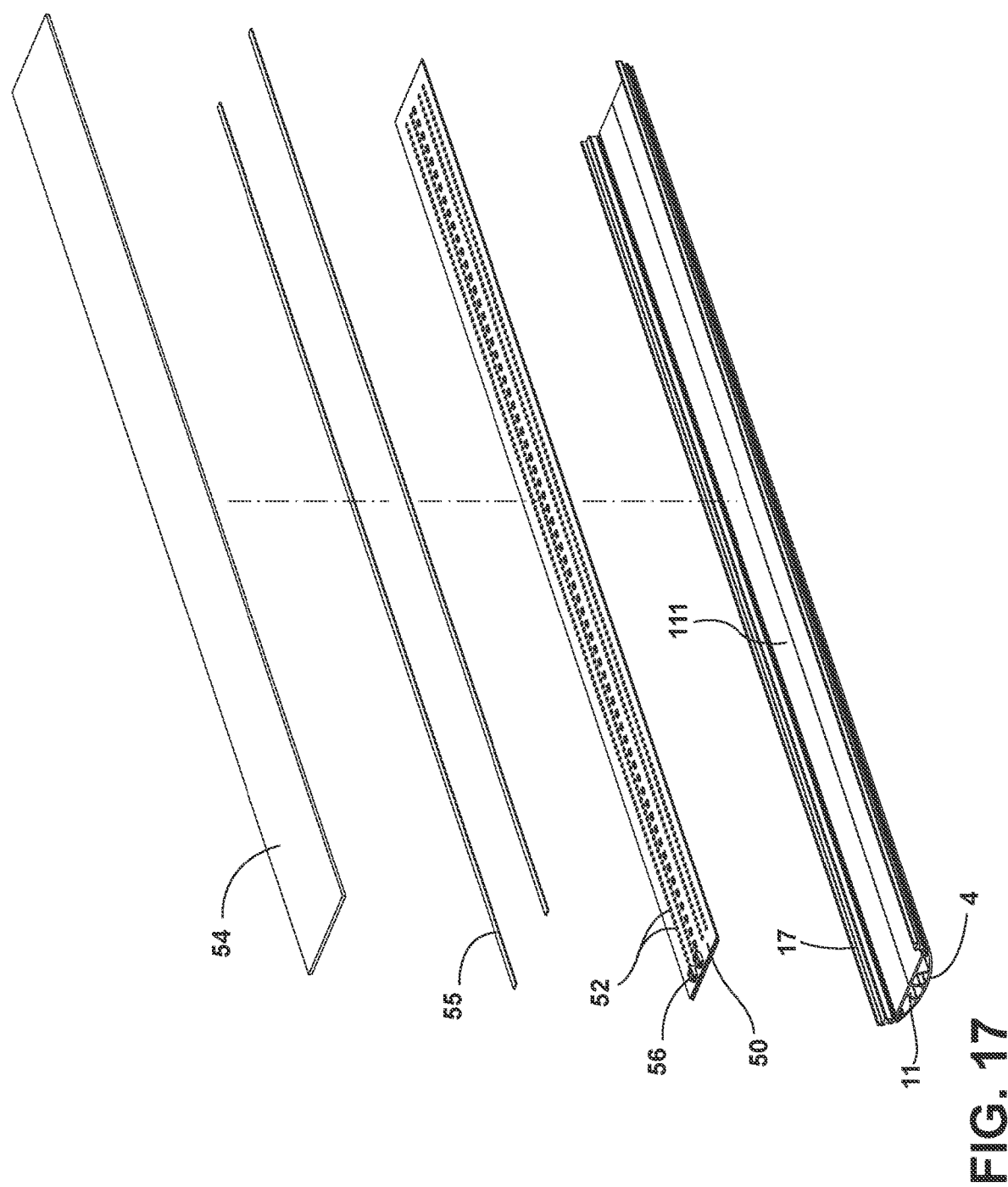
FIG. 17 is a bottom perspective view of the components of the reflector housing shown in FIG. 1.

As illustrated in FIG. 17, the PCB 50 has channels of LED chips 52 and a printed circuit board connector 56. The PCB 50 is coupled to the printed circuit board support surface 111. In addition, strips of sealant and/or adhesive 55 can be placed on the lens support surface 17 to help couple the lens 54 to the reflector housing 4.

Figure 11:
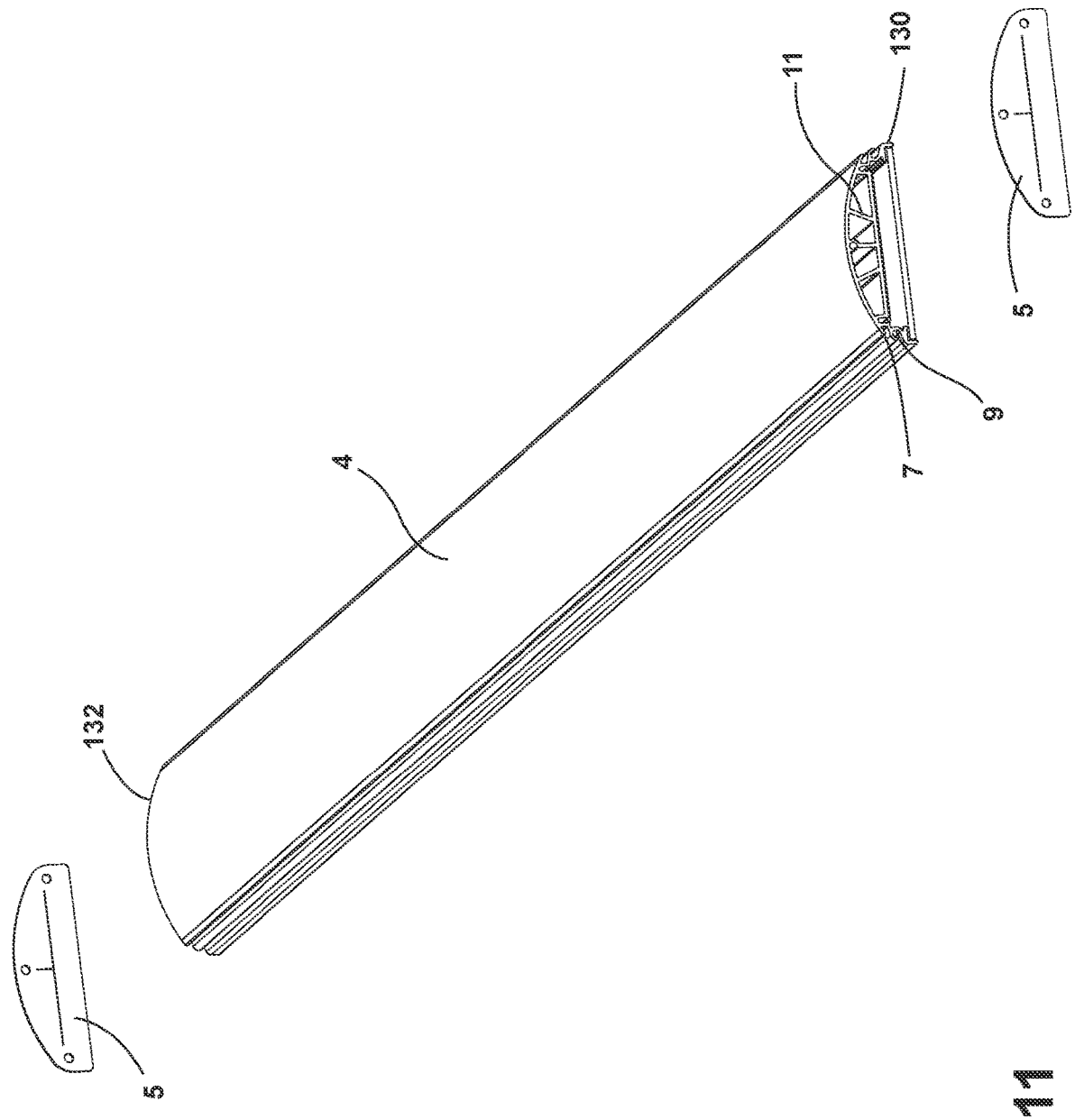
FIG. 11 is a top perspective view of a reflector housing for the LED growth light shown in FIG. 1.
Figure 12:
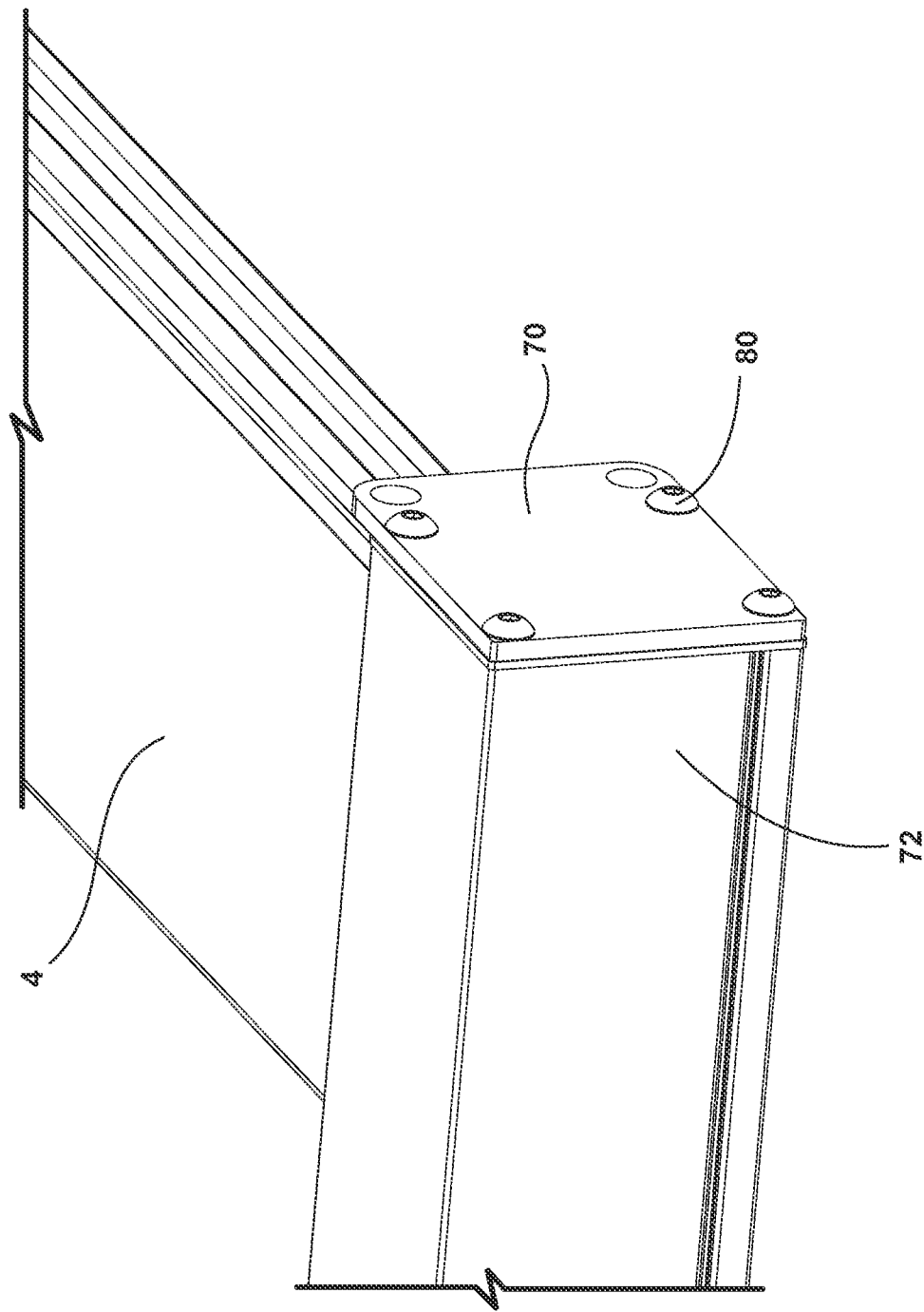
FIG. 12 is a partial front view of the LED growth light shown in FIG. 1.
Figure 18:
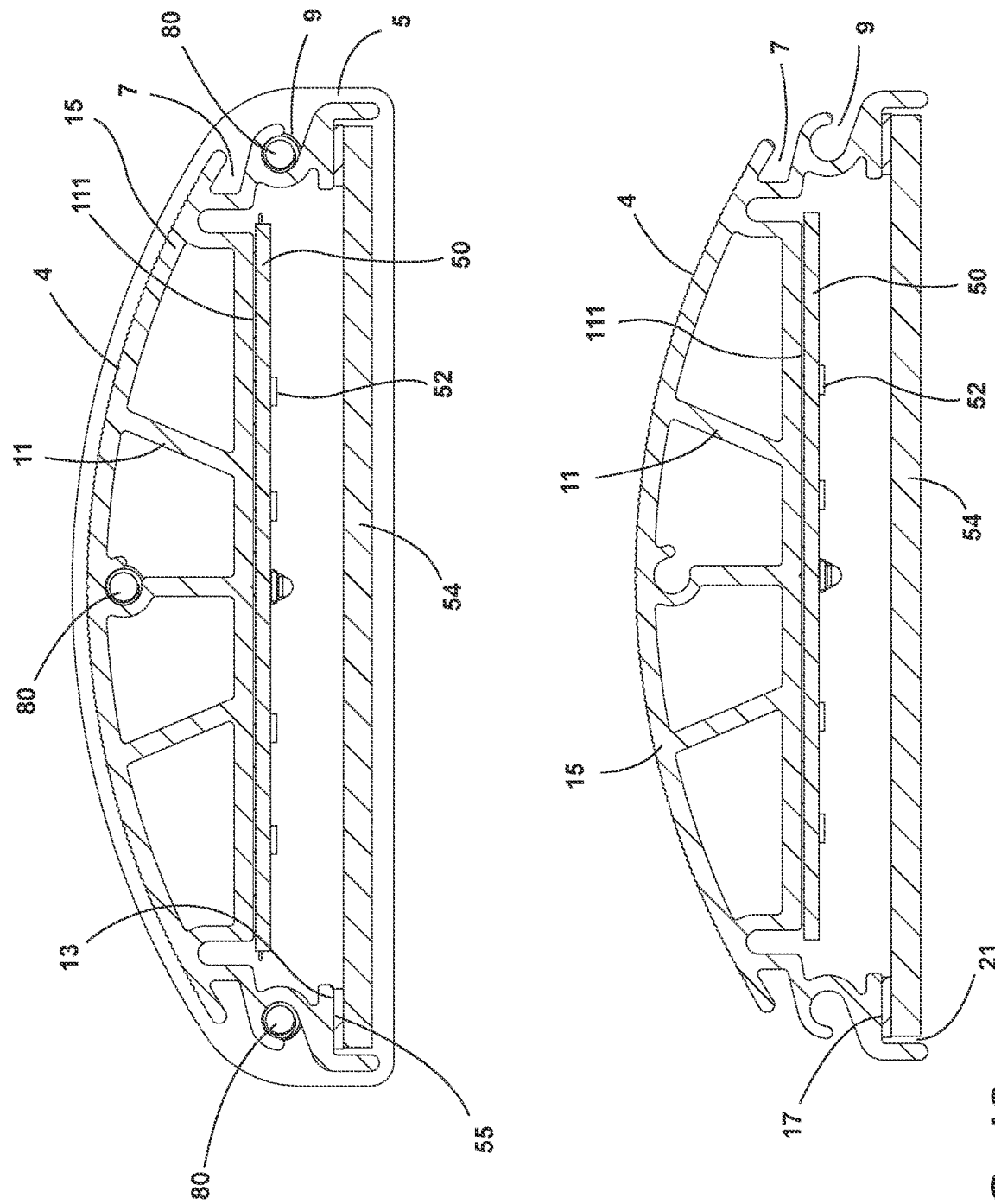
FIG. 18 are front and back views of a reflector housing utilized in the LED growth light of FIG. 1.
Figure 19:
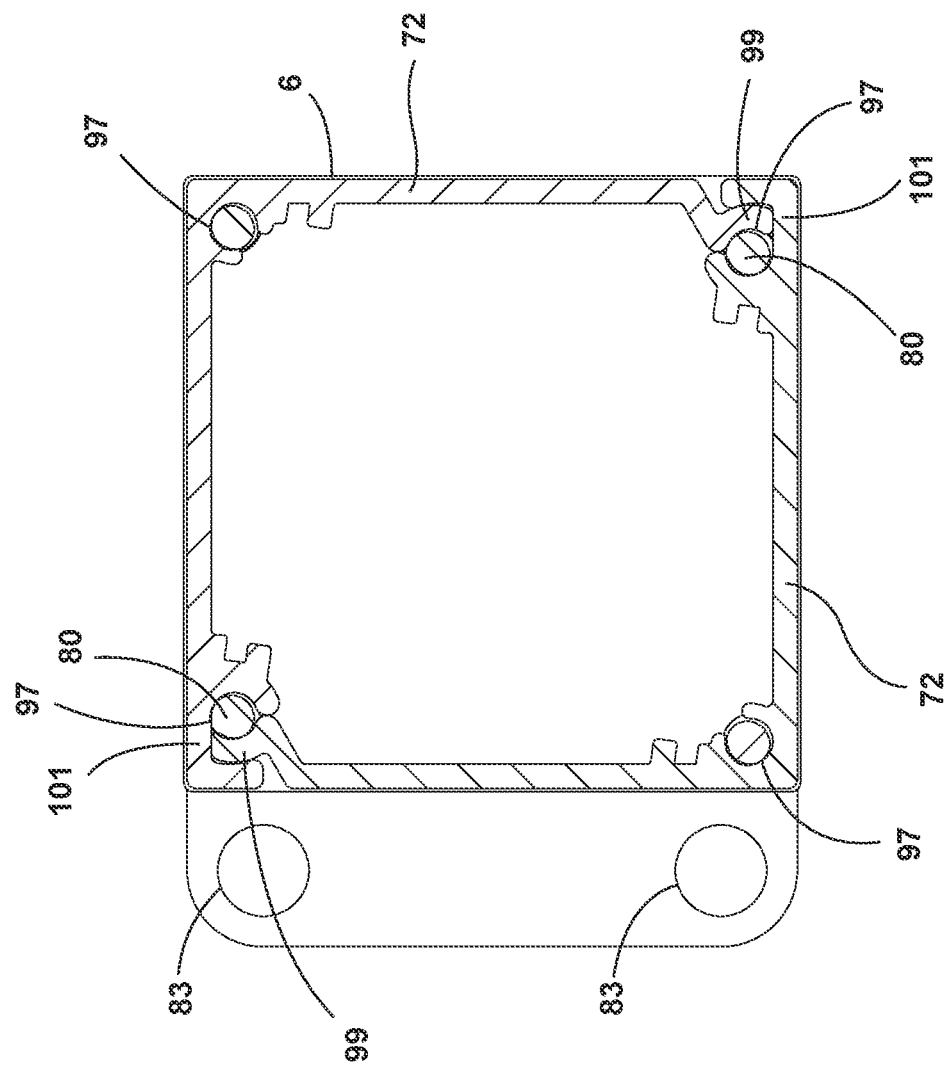
FIG. 19 is a side view of the wiring compartment of the LED growth light shown in FIG. 1.
Figure 20:
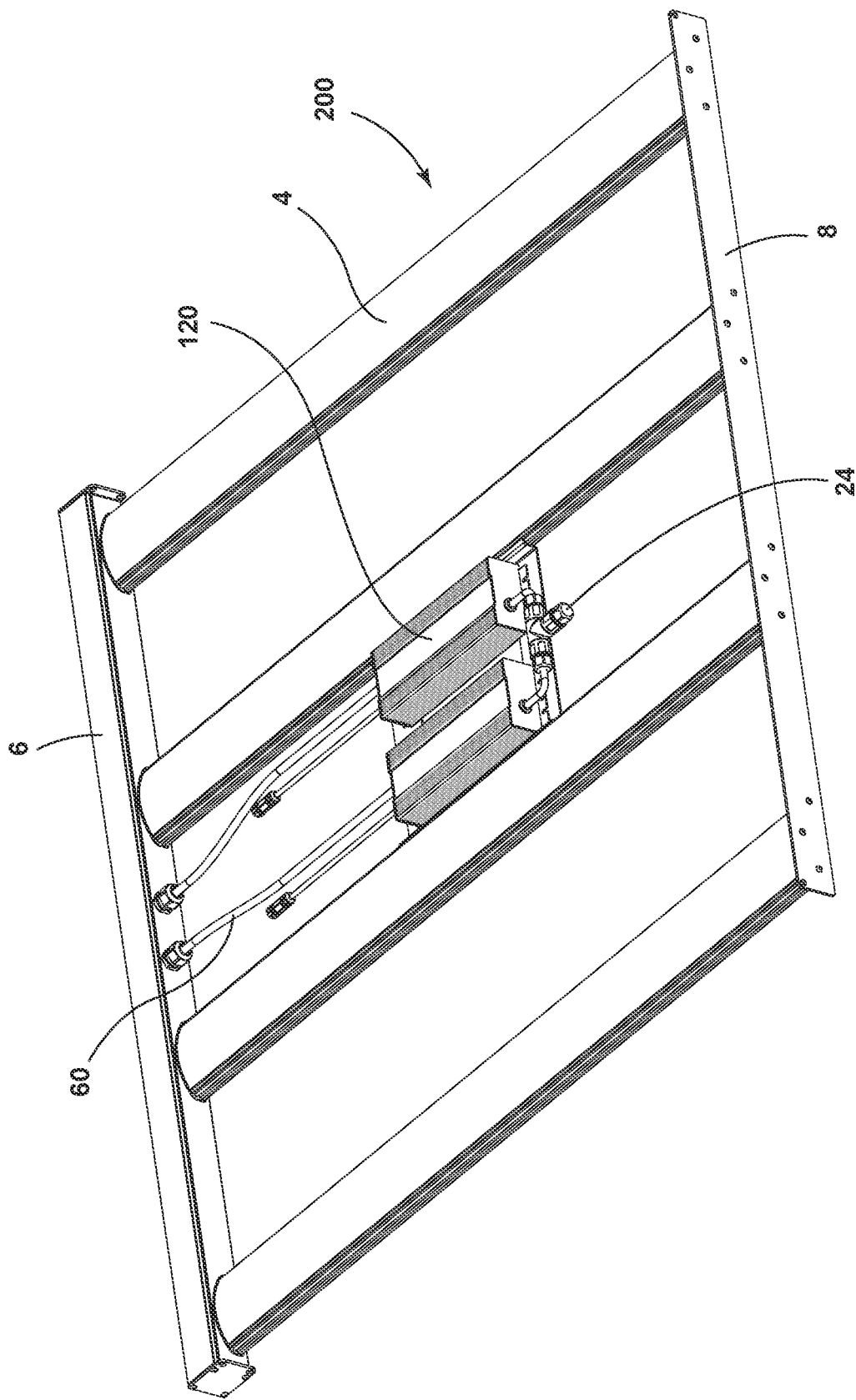
FIG. 20 is top perspective view of another embodiment of an LED growth light.
Figure 21:
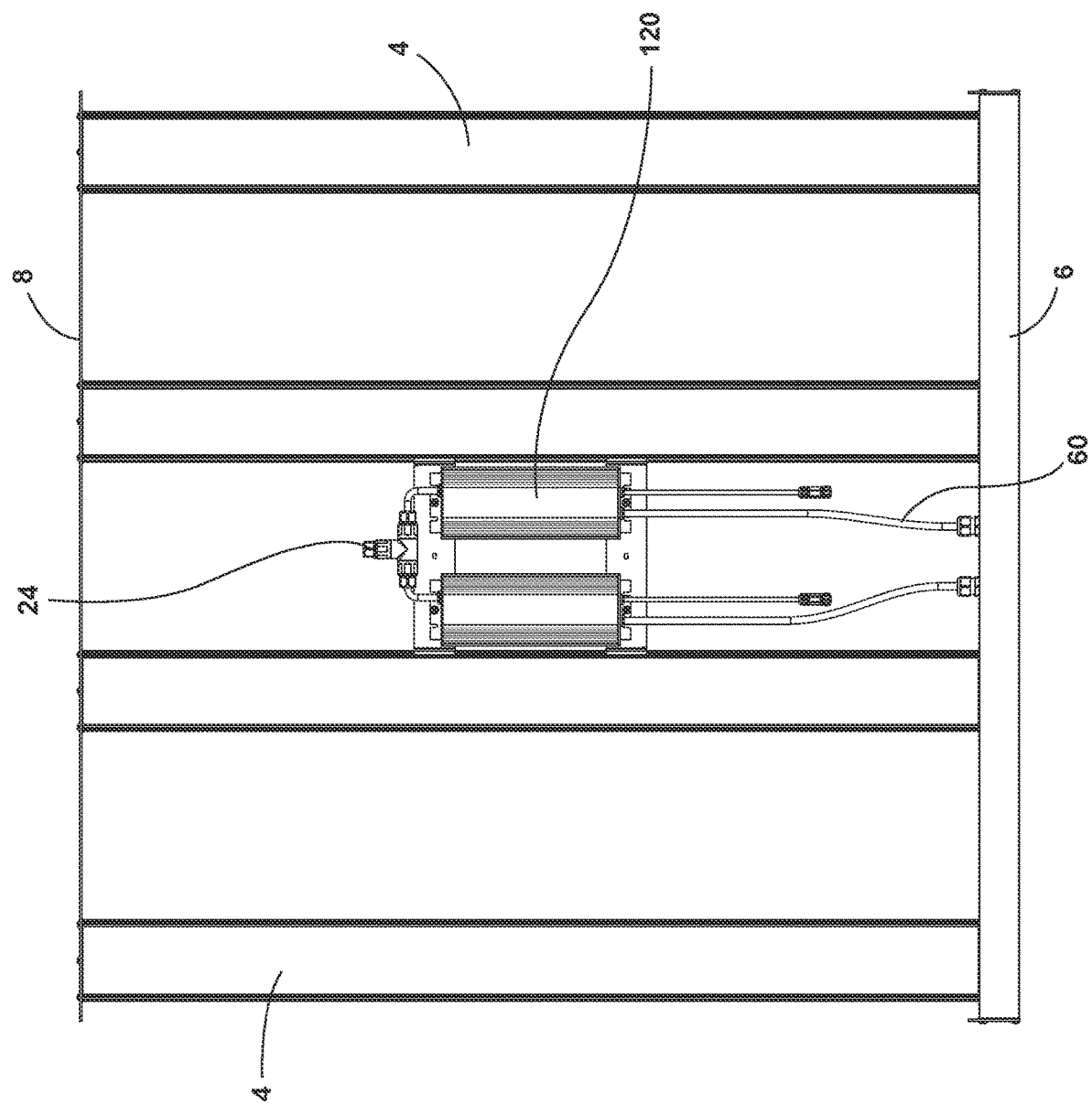
FIG. 21 is a top view of the LED growth light shown in FIG. 20.
Figure 22:
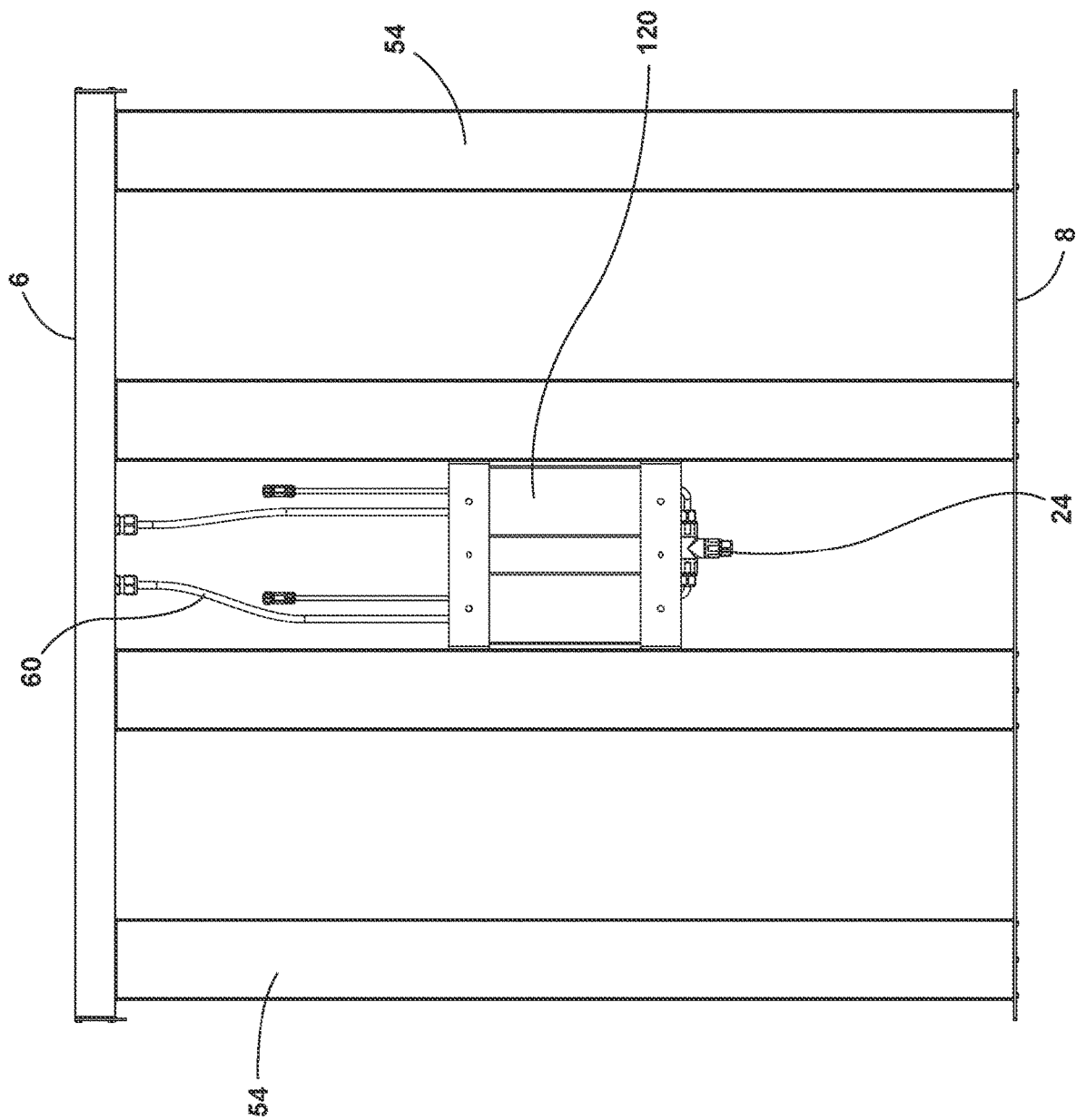
FIG. 22 is a bottom view of the LED growth light shown in FIG. 20.
Figure 23:
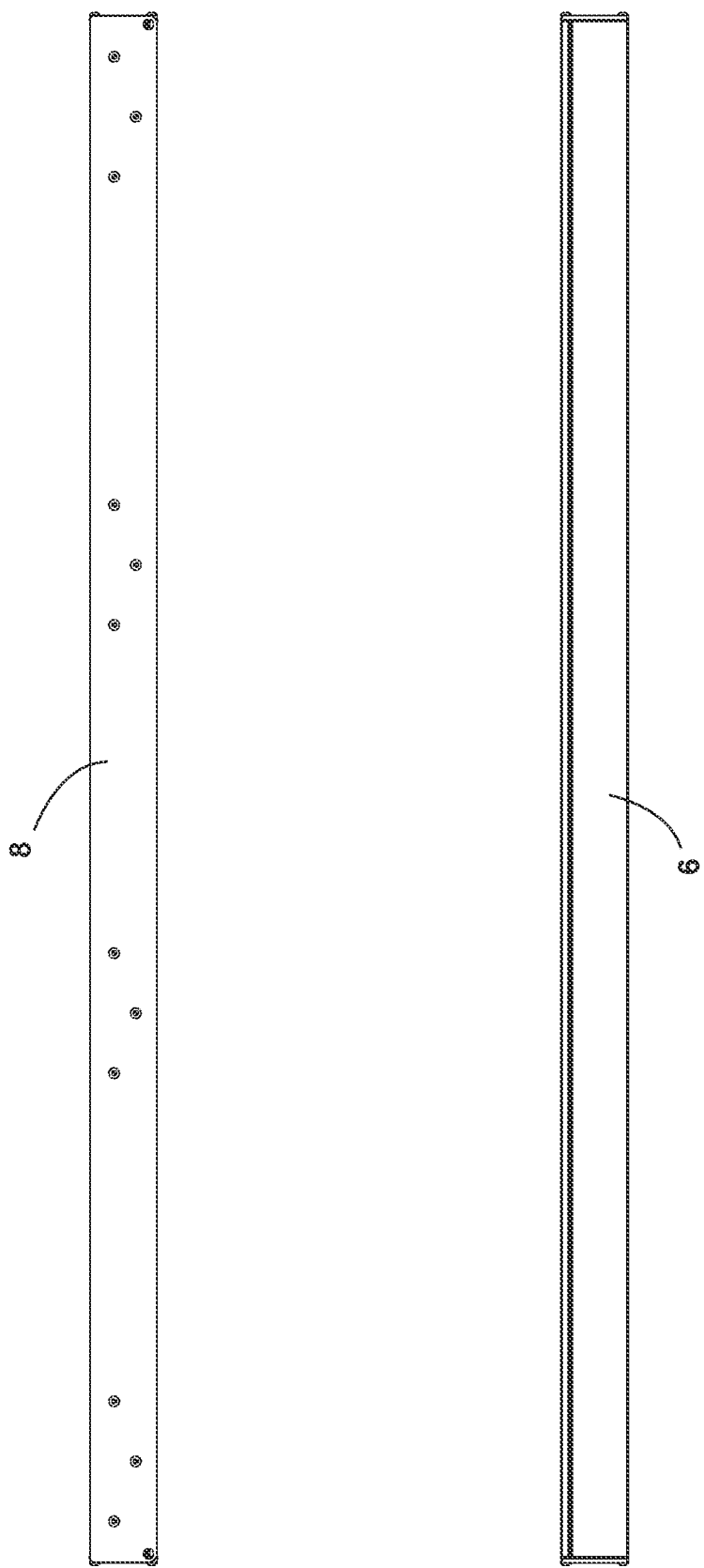
FIG. 23 are back and front views of the LED growth light shown in FIG. 20.
Figure 24:
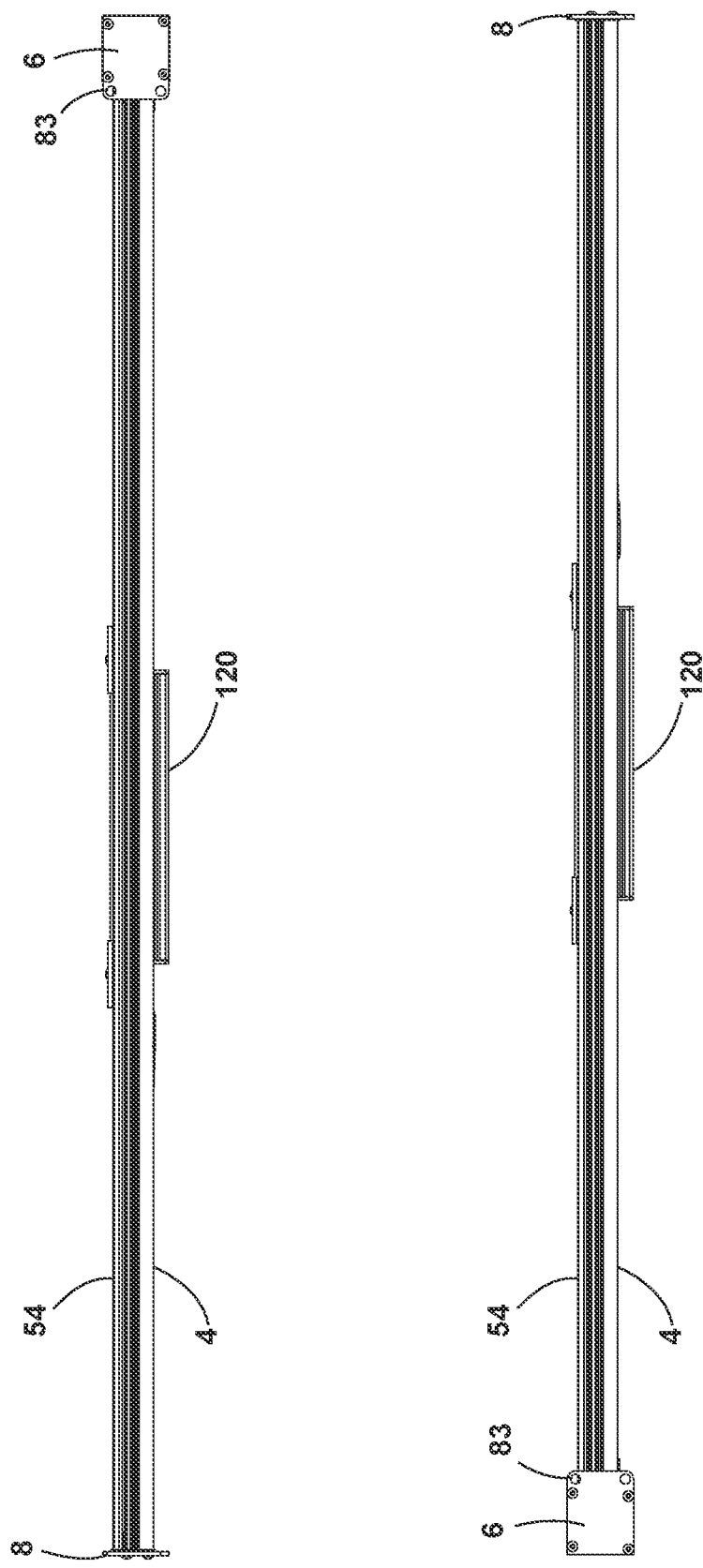
FIG. 24 are side views of the LED growth light shown in FIG. 20.

The reflector housings 4 includes a front end 132 and rear end 130. In addition, the side surfaces of the reflector housing 4 include grooves 7 and 9 on the exterior surface of each side of the reflector housing 4. At least one of the grooves 9 is shaped to receive a fastener 80, as illustrated in FIGS. 11 and 18. The LED driver 20 couples to at least one of the grooves 7 and/or 9 as disclosed above. A gasket member 5 is positioned adjacent to the front 132 and rear 130 surfaces of the reflector housing 4.

Figure 9:
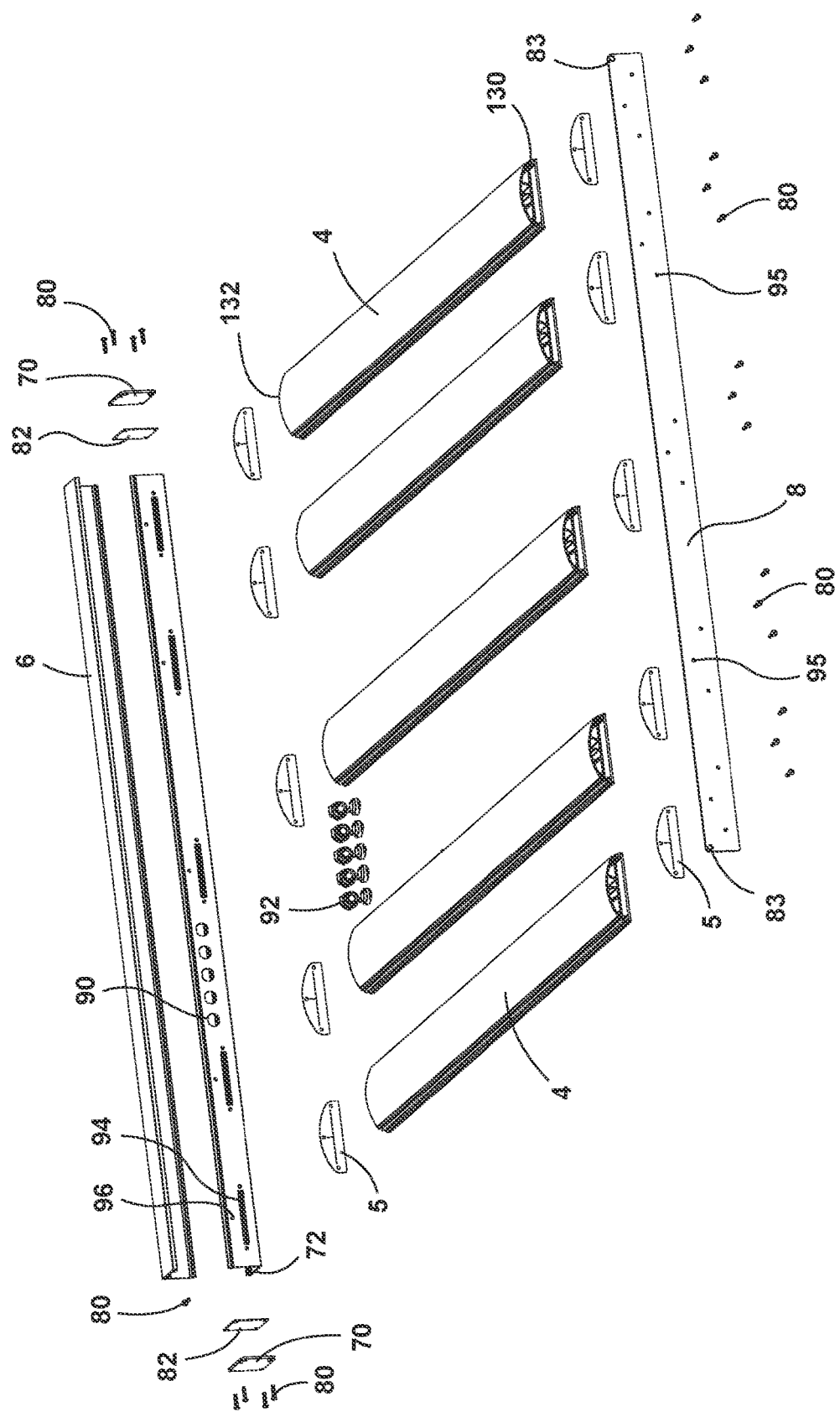
FIG. 9 is a top perspective view of the components of the LED growth light shown in FIG. 1.
Figure 10:
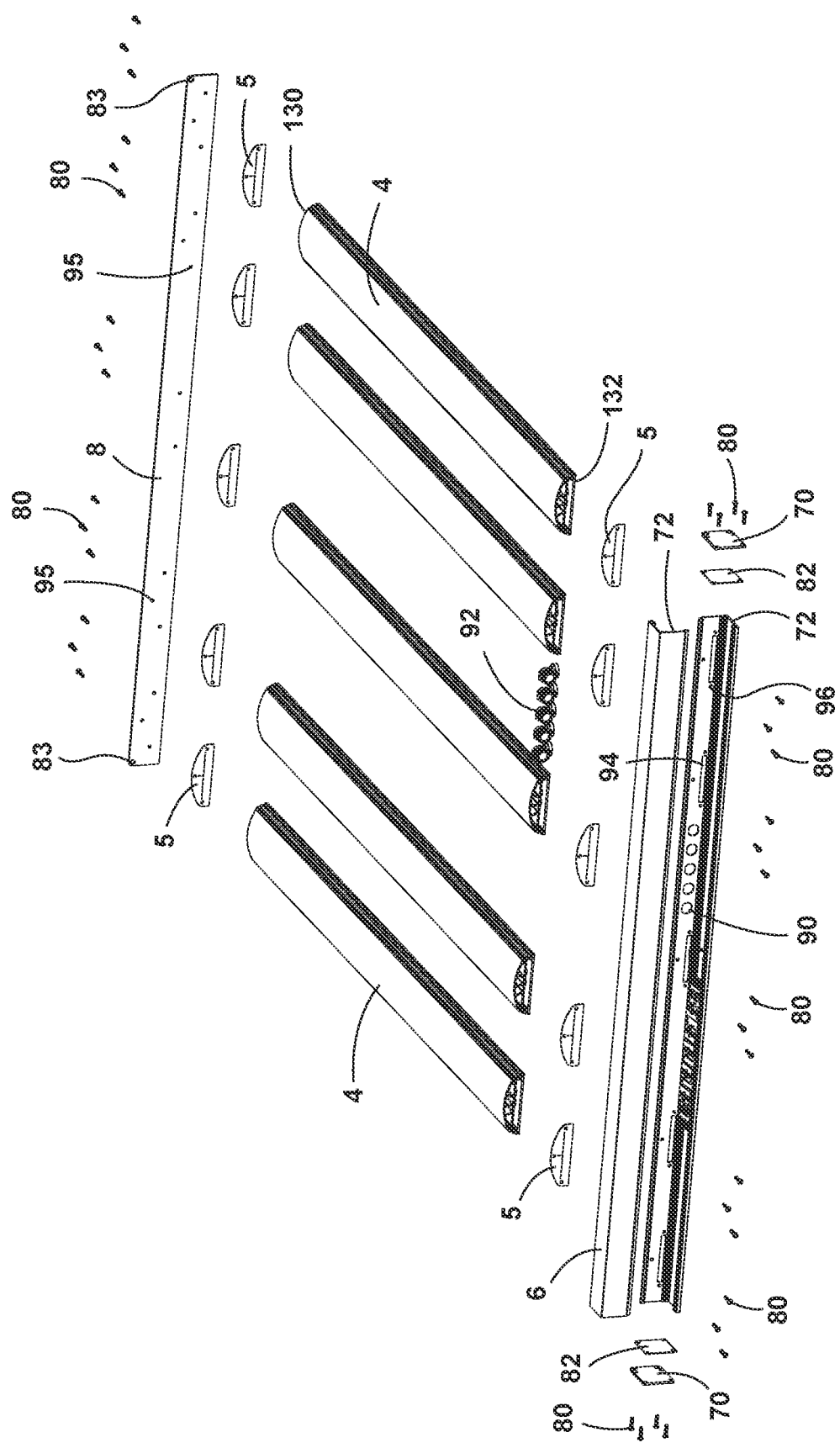
FIG. 10 is a rotated top perspective view of the components of the LED growth light shown in FIG. 1.
Figure 13:
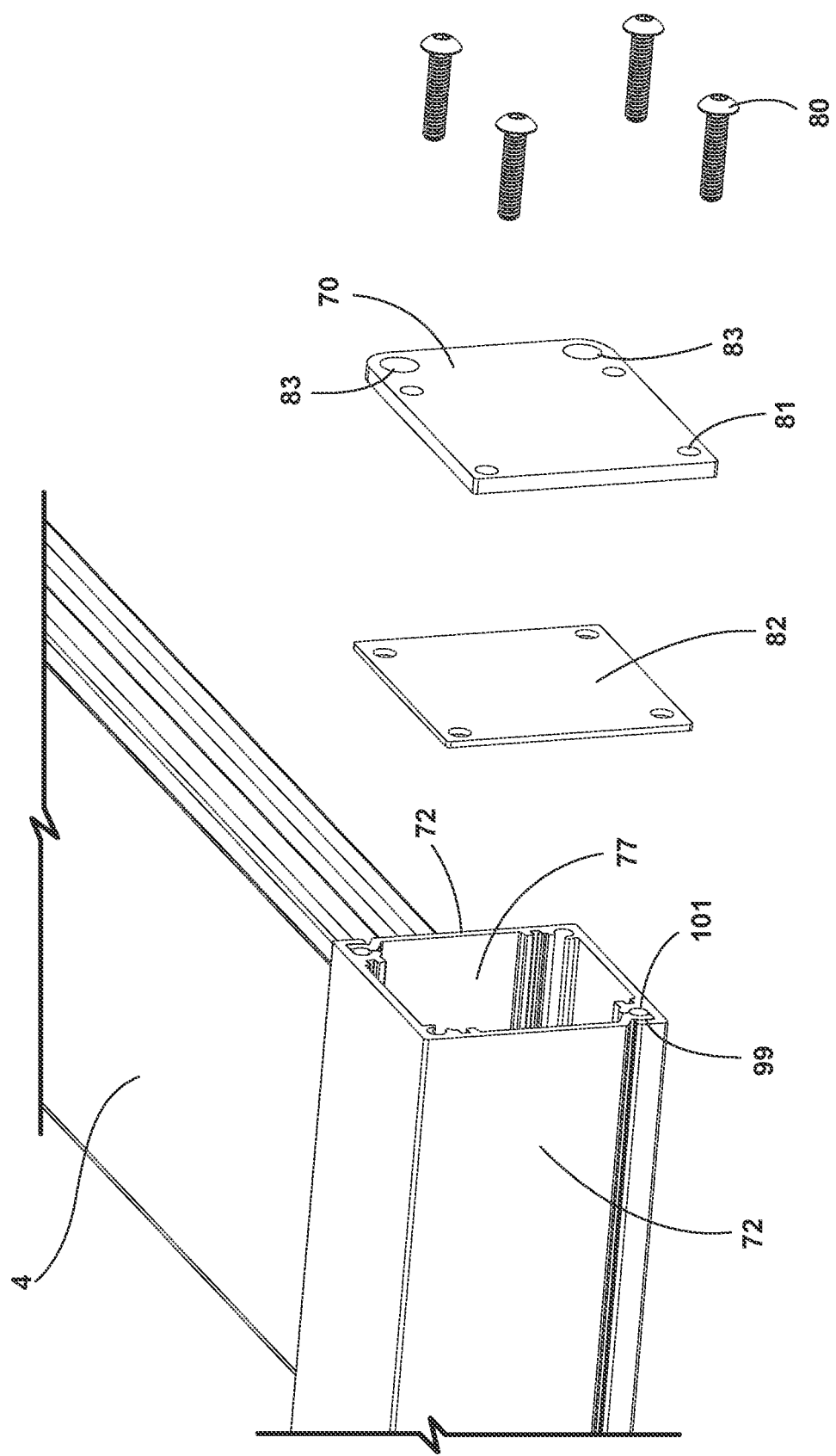
FIG. 13 is a partial front view of the LED growth light shown in FIG. 1 with the gasket and cap removed from an end of the wiring compartment.
Figure 14:
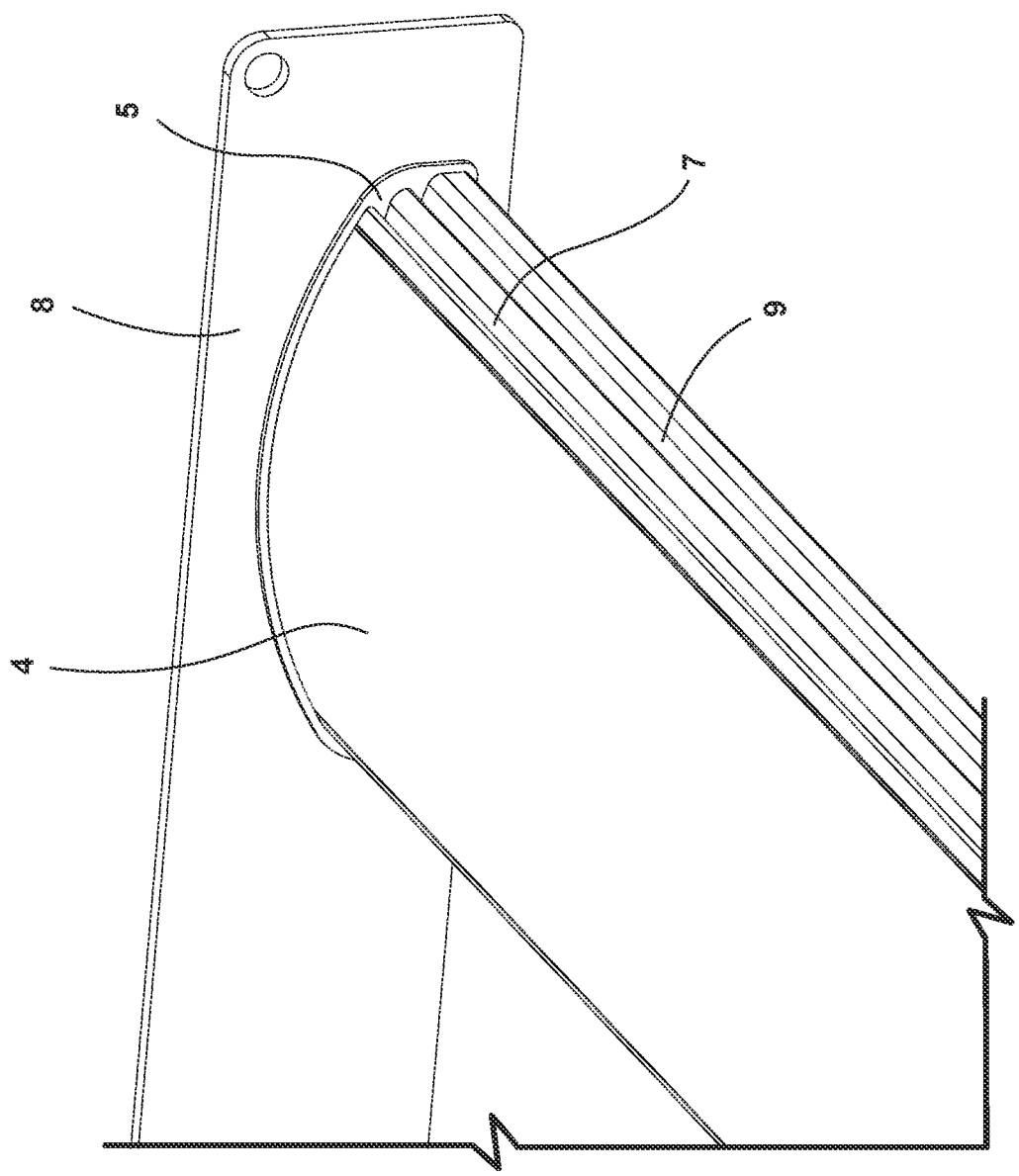
FIG. 14 is a top back perspective view of the LED growth light shown in FIG. 1.
Figure 15:
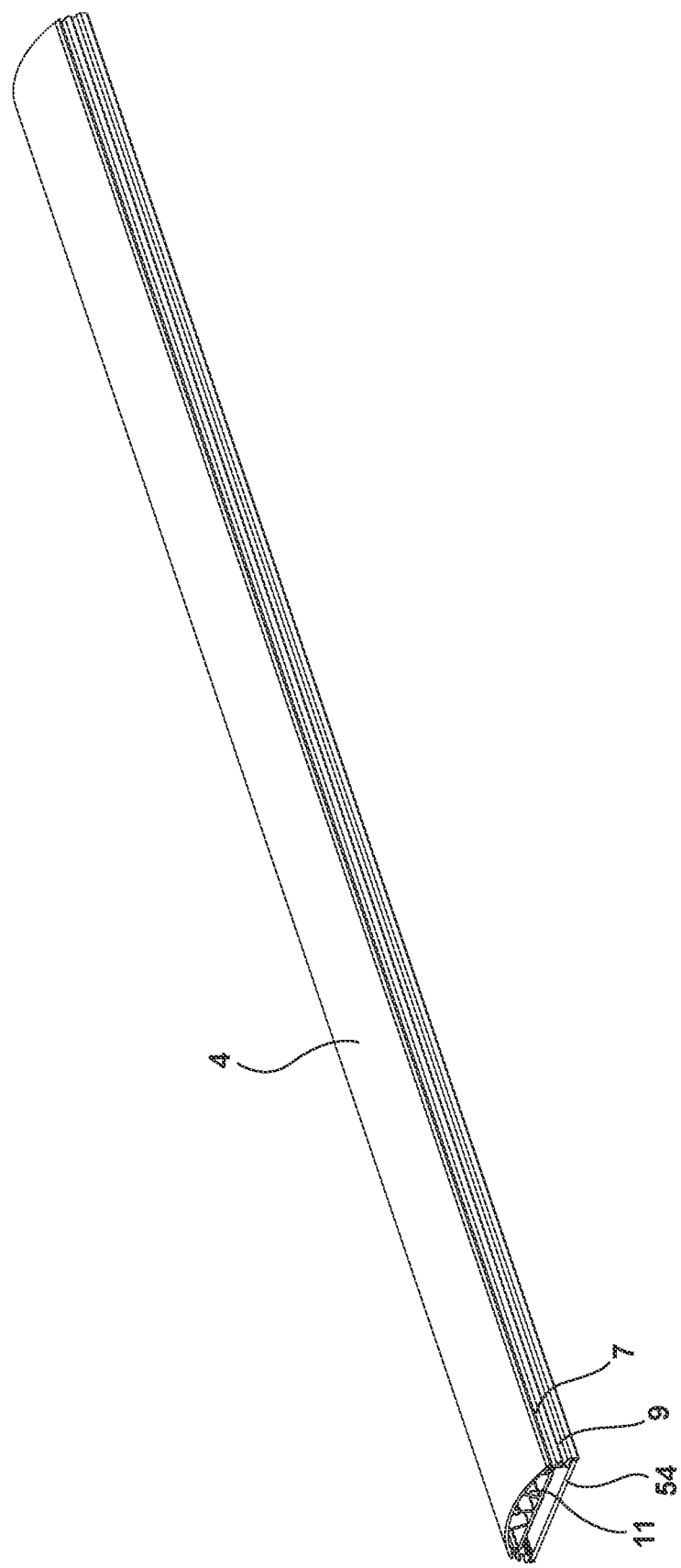
FIG. 15 is a side perspective view of a reflector housing utilized in FIG. 1.
Figure 16:
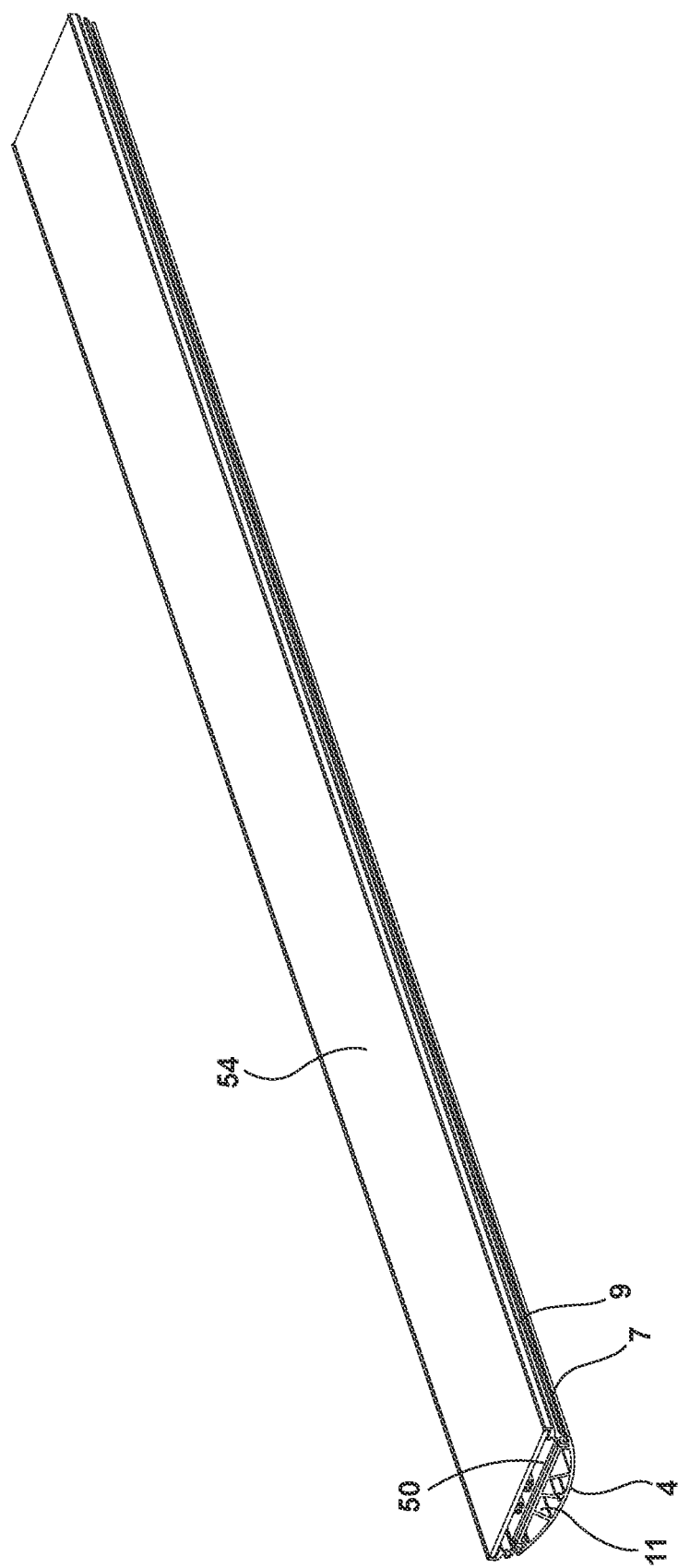
FIG. 16 is a bottom perspective view of the reflector housing shown in FIG. 1.

The LED growth light 2 also includes a wiring compartment 6. The wiring compartment 6 is assembled from two sections 72. In the illustrated embodiments, the sections 72 are generally L-shaped, but can be of other shapes depending upon whether the wiring compartment 6 will have a square-, rectangular-, curve-, or other shaped cross-sectional profile. Each section 72 includes a tab portion 99 and a tab receiver portion 101. When the tab portion 99 is received within the tab receiver portion 101, a fastener opening 97 is created between the tab portion 99 and the tab receiver portion 101. As illustrated in FIG. 13, the two sections 72 are mirror images of each other, other than the openings that are formed in the wall of the wiring compartment 6 that faces the front end 132 of the reflector housing 4. Thus, the interlocking sections 72 can be formed from the same metal forming tool, extrusion, and/or process. The wall of the section 72 of the wiring compartment 6 that faces the reflector housing 4 includes a plurality of fastener openings 96 that align with the fastener openings in the front end 132 of the reflector housing 4 and the openings in the gasket 5 if the gasket 5 is used. In addition, the section 72 includes LED board opening 94 and cable openings 90 that can couple to cable connectors 92, as illustrated in FIG. 9.

The wiring compartment 6 includes all of the wiring for the power supply to the individual PCBs 50. The wiring within the wiring compartment 6 can couple to the printed circuit board connector 56 on the LED PCBs 50. Individual wires can be run between each channel of LED chips 52 in corresponding reflector housings 4. End caps 70 are coupled to the ends of the wiring compartment 6. A cap gasket 82 may be used to help seal the ends of the wiring compartment 6. The end caps 70 include fastener openings 81 through which fasteners 80 can be received. The fasteners 80 will also enter into corresponding openings in the gasket 82 and into the openings 97 on the ends of the wiring compartment 6. When the fasteners 80 are inserted into the fastener openings 97 in the ends of the wiring compartment 6 where the tab 99 and the tab receiver 101 mate together, the curved tab 99 is compressed against a surface of the tab receiver 101 helping to secure the two sections 72 together. In addition, an optional sealant may be placed to help seal the interface between the curved section of the tab 99 and the correspondingly curved section of the tab receiver 101.

The wiring compartment 6 has an internal cavity once the two L-shaped sections 72 are coupled together. Fasteners 80 are inserted through the fastener openings 96 in the wiring compartment 6 through the gasket 5 and into the first end 132 of the reflector housing 4. Similarly, fasteners 80 are inserted through fastener openings 95 in the rear plate 8 through gasket 5 and into the rear section 130 of the reflector housings 4.

The end cap 70 can include hanger openings 83 to allow the LED growth light 2 to be suspended. For example, a chain, rope, clip, or other suspension device can be coupled to the suspension openings 83 in the end cap 70 and in the plate 8 to suspend the LED growth light 2 above the plants. While the end caps 70 are shown as not having any openings, vent openings can be added to the end caps 70.

The LED driver 20 has a rated input voltage of 220 to 480 VAC. In the embodiment illustrated in FIG. 1, the LED driver 20 has a five channel DC output. In addition, the LED driver 20 may be programmable via USB, Bluetooth module, or other manner. The LED driver 20 has a max-out power of at least 150 watts per channel and allows each individual channel to be separately dimmed. The LED driver 20 is a 750 watt driver that features five channels of simultaneous dimming and individual dimming functions. LED driver 20 is designed to adapt to a wide temperature range of −40° to 55° C. The LED driver 20 is in an anodized aluminum case and appropriately sealed so that it can be utilized in a damp environment. The LED driver 20 can be located in other housings that provide heat dissipation and are sealed from exterior materials, such as water, debris, external heat, etc.

The LED driver 20 includes one or more power connections 24 and one or more cable gland connections that can connect to a cable 60 that couples to the cable connectors 92 coupled to the wiring compartment 6. Each of the cables 60 can provide power to the corresponding channel of LEDs on the PCBs 50 within the individual reflector housings 4 of LED growth light 2.

Figure 27:
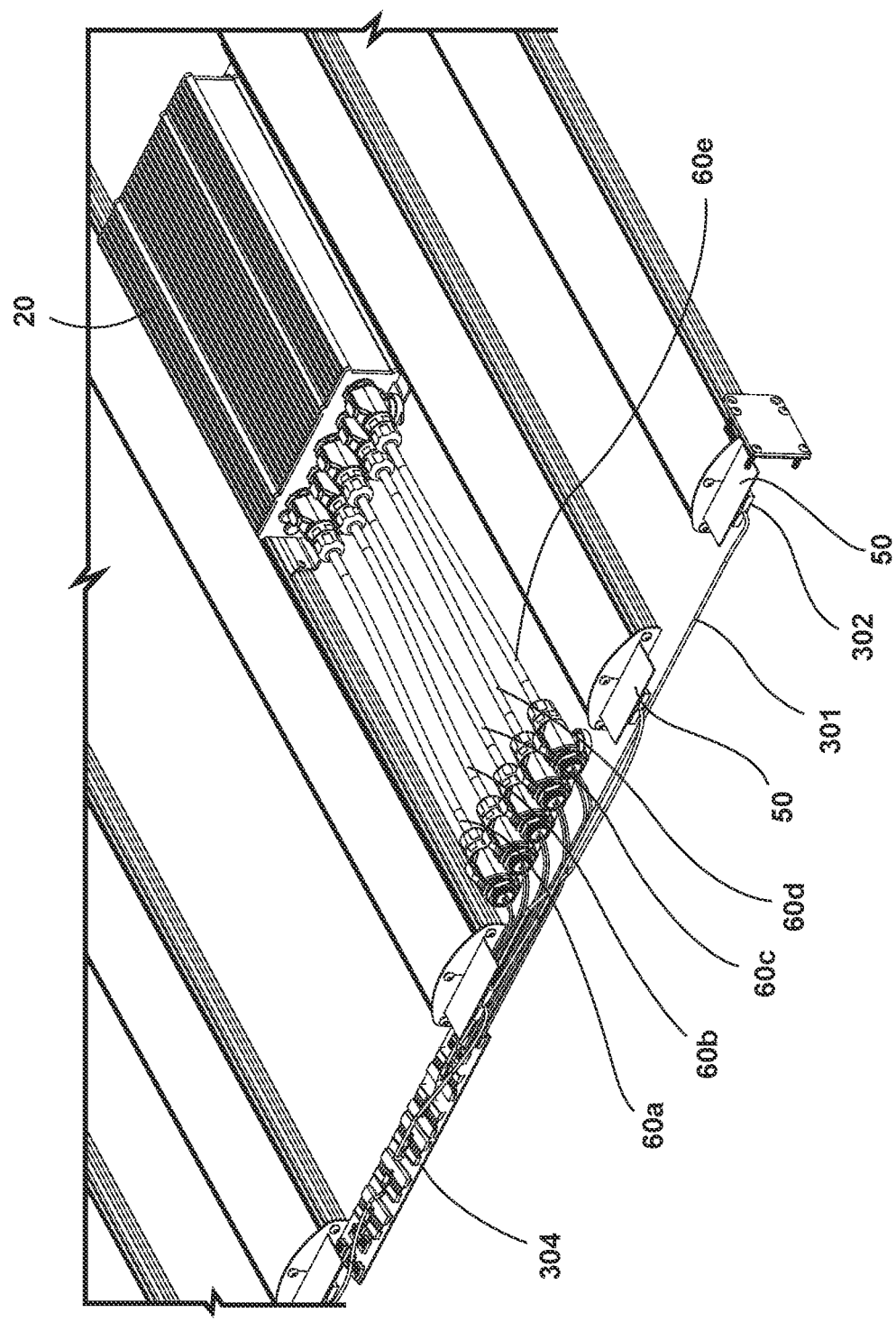
FIG. 27 is a partial top perspective view of an LED growth light.
Figure 28:
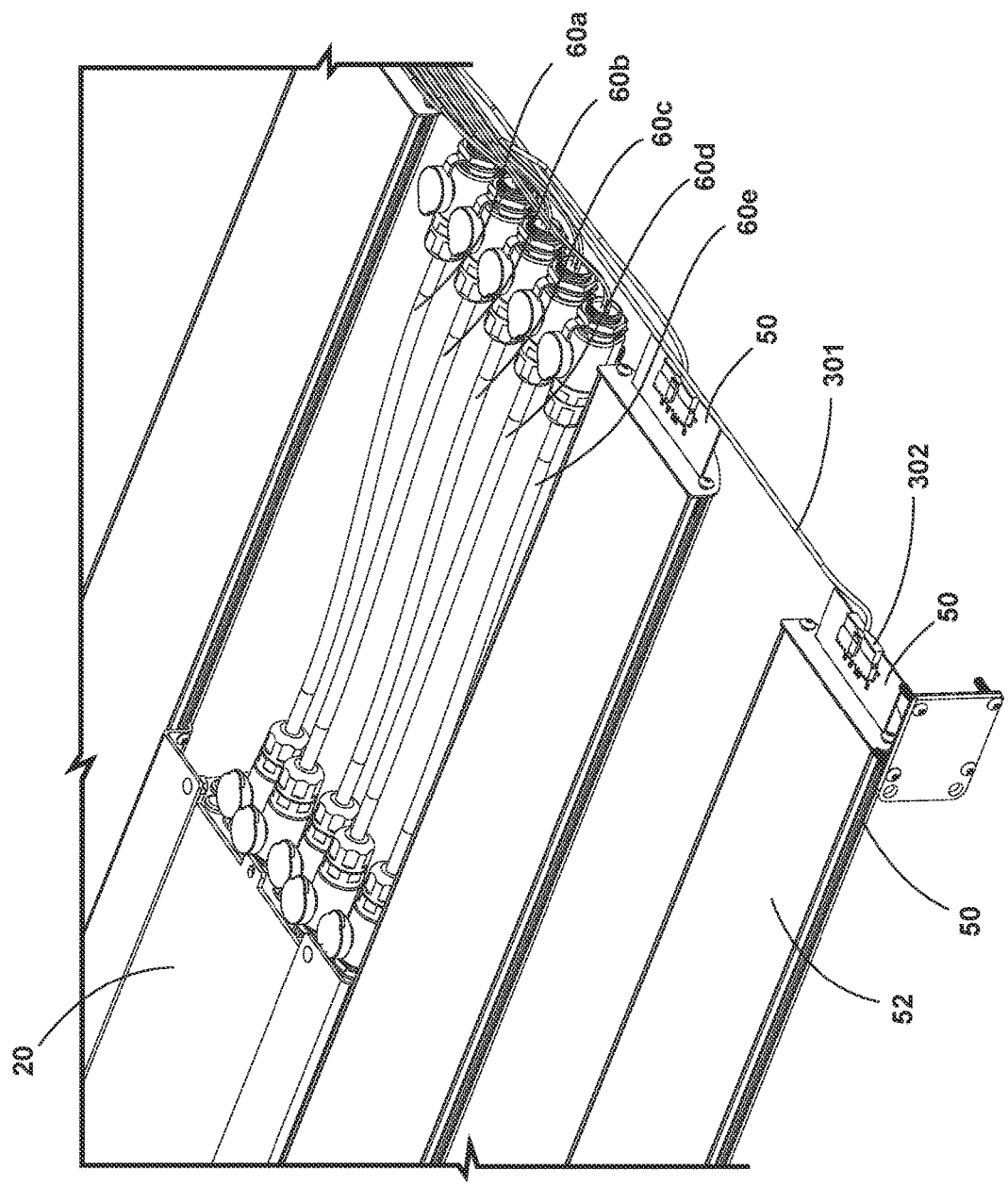
FIG. 28 is a partial bottom perspective view of the LED growth light shown in FIG. 27.

The PCB 50 illustrated in FIGS. 27 and 28 include five rows of LED chips 52. The rows of LED chips 52 can be straight or can be non-linear. In the illustrated embodiment, the PCB 50 includes two rows of cool white LED chips, one row of warm white LED chips, one row of red LED chips, and one row of blue LED chips. In the illustrated embodiment, both outermost rows are the cool white LED chips, with the middle row being the warm white LED chips. The red row includes LED chips in the range of 600-740 nanometers. The blue row includes LED chips in the range of 360-495 range. The end of the PCB 50 can include an optional connector end to couple to the wiring for each row of LED chips 52.

The PCB 50 illustrated in FIGS. 27 and 28 would have each row of LED chips correspond to a single channel from the LED driver 20. In other embodiments, such as the embodiment shown in FIG. 17, the five rows of LED chips are driven by two channels from an LED driver 20. In that embodiment, the four outermost rows of LED chips are white LED chips controlled by a single dimmable channel. The middle row is a row of red and/or blue LED chips controlled by another dimmable channel. In the illustrated embodiment, the middle row is a row of red LED chips.

FIGS. 27 and 28 illustrate wiring 301 extends from cables 60a-60e to distribution hub 304 and to the individual PCBs 50. The distribution hub 304 can be suspended and/or placed on an angle within wiring compartment 6 to protect it from moisture, to help dissipate heat and/or to otherwise protect the distribution hub 304. The distribution hub 304 may have ports or other components for connecting to sensors or other accessories. The connections may be wiring or by remote/Bluetooth/wireless capabilities. The wiring 301 can be individual wires and/or wiring ribbons with multiple wires. The wiring 301 couples to connectors 302 which are coupled to PCBs 50. The rows of LED chips 52 will be dimmable based upon the associated wiring 301 between that row and the individual cable 60 coupled to the LED driver 20. The end of the PCB 50 can enter into the wiring compartment 6 through LED board opening 94 and can be partially supported by one or more surfaces on the wiring compartment 6. The distribution hub 304 receives the wiring from each cable 60 that is associated with a channel on said LED driver 20. The distribution hub 304 then provides that power to a specified row(s) of LED chips 52 on each PCB 50 within the LED growth light 2, 200. This can be in a daisy chain wiring scheme or other format.

The individual dimmable channels from the LED driver 20 can be directed to a single row of LED chips 52, as illustrated in FIGS. 26 and 27, or can be directed to multiple rows of LED chips 52, as illustrated in FIG. 17.

For example, in the context of FIGS. 26-27, wiring 301 within the wiring compartment 6 is coupled to the cables 60a-60e that are associated with each of the five channels on LED driver 50. The wiring can then complete each individual channel on each of the PCBs 50 on each reflector housing 4. Thus, in the illustrated embodiment, the cable gland 60a would provide power and dimming to a cool white row of LED bulbs in each reflector housing 4. In contrast, the wiring 301 within the wiring compartment 6 of the embodiment shown in FIG. 17 results in one cable and one channel on LED driver 20 being dedicated to the middle row of LED chips 52 and one cable and channel being used for the four other rows of LED chips 52.

A second embodiment of an LED growth light 200 is illustrated in FIGS. 20-26. This LED growth light 200 utilizes the same wiring compartment 6, backplate 8, and reflector housings 4. The LED driver 120 has two channels of independent dimming for the rows of LED chips 52. The rows of LED chips includes LED chips with a nanometer range of 390-780. The LED growth light 200 can be dimmed to include a full spectrum; white LED chips only; red lighting in between the 600-800 nanometer range; and/or blue lighting in the 360-495 range. The LED growth light 200 includes four reflector housings 4 coupled in between the wiring compartment 6 and the backplate 8. A power supply cord can be coupled to the power supply connection 24 of the LED driver 120.

In the illustrated embodiments, the reflector housings 4 of the LED lights 2 and 200 are made from an anodized aluminum. However, any type of material can be used for the reflector housings 4 provided that the material helps protect the internal components from heat generated by the PCBs 50, the LED driver 20, or other external sources and helps protect against moisture or other external components/hazards.

Accessories such as fans, moisture sensors, temperature sensors, mirrors, cameras, etc. can be coupled to grooves 7 and/or 9 on the reflector housings 4, to the wiring compartment 6, to the plate 8, and/or positioned within the reflector housings 4 and/or wiring compartment 6.

As described above, the LED driver 20 permits the user to selectively increase one or more rows of the LED chips 52 to provide the plants with an increased amount of whatever portion of the light spectrum the user wants to use with the plants. This will permit the user to alter the length of the lighting, the intensity of the lighting, variations in peaks of the lighting, and the distribution of the wave lengths of lighting to be tailored with respect to the different types of plants or the stage of the plant growth.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention is claimed as follows:

1. A growth light comprising:
    at least two reflector housings, said reflector housings including a convex upper surface, an opening in a lower surface, a lens support surface adjacent to said opening, a plurality of ridges extending between said convex upper surface and a printed circuit board support surface, at least one exterior groove on a side surface of said reflector housing, and at least one fastener opening on the front surface;
    an LED driver coupled between said at least one exterior groove of two adjacent reflector housings;
    a wiring compartment having an internal cavity, including at least one fastener opening that aligns with said at least one fastener opening on said front surface of said reflector housing;
    at least one fastener that is coupled from the internal cavity of said wiring compartment through said aligned at least one fastener opening on said front surface of said reflector housing and said wiring compartment; and
    a multichannel printed circuit board with at least two rows of LED chips arranged on said printed circuit board, said printed circuit board coupled to said printed circuit board support surface of said reflector housing.

2. The growth light of claim 1, wherein said at least one exterior groove is a pair of grooves on each side of said reflector housing.

3. The growth light of claim 1, wherein said wiring compartment includes a first member with a tab and a tab receiver section and a second member with a tab and a tab receiver section.

4. The growth light of claim 3, wherein the tab of the first member is received in the tab receiver section of the second member and the tab of the second member is received in the tab receiver section of the first member.

5. The growth light of claim 1, wherein said multichannel printed circuit board has five individually powered rows of LED chips.

6. The growth light of claim 1, wherein said LED driver includes a channel that powers multiple rows of LED chips.

7. The growth light of claim 1, wherein said at least two reflector housings are coupled between said wiring compartment and a plate member.

8. The growth light of claim 1, wherein said wiring compartment includes openings that receive a portion of said printed circuit board to permit a portion of said printed circuit board to be positioned within said wiring compartment.

9. An LED light comprising:
    at least two reflector housings, said reflector housings including a convex upper surface, an opening in a lower surface, a lens support surface adjacent to said opening, at least one exterior groove on a side surface of said reflector housing, and at least one fastener opening on the front surface;
    an LED driver coupled between said at least one exterior groove of two adjacent reflector housings;
    a wiring compartment having an internal cavity, including at least one fastener opening that aligns with said at least one fastener opening on said front surface of said reflector housing;
    at least one fastener that is coupled from the internal cavity of said wiring compartment through said aligned at least one fastener opening on said front surface of said reflector housing and said wiring compartment; and a multichannel printed circuit board with at least two rows of LED chips arranged on said printed circuit board, said printed circuit board positioned on said reflector housing.

10. The LED light of claim 9, wherein said at least one exterior groove is a pair of grooves on each side of said reflector housing.

11. The LED light of claim 9, wherein said wiring compartment includes a first member with a tab and a tab receiver section and a second member with a tab and a tab receiver section.

12. The LED light of claim 11, wherein the tab of the first member is received in the tab receiver section of the second member and the tab of the second member is received in the tab receiver section of the first member.

13. The LED light of claim 12, wherein the tab receiver section and the tab form a fastener opening.

14. The LED light of claim 9, wherein said multichannel printed circuit board has individually powered rows of LED chips.

15. The LED light of claim 9, wherein said LED driver includes a channel that powers multiple rows of LED chips.

16. The LED light of claim 9, wherein said at least two reflector housings are coupled between said wiring compartment and a plate member.

17. The LED light of claim 16, wherein the wiring compartment and plate member have suspension openings.

18. An LED growth light comprising:
at least two reflector housings, said reflector housings including a convex upper surface, an opening in a lower surface, a lens support surface adjacent to said opening, at least one exterior groove on a side surface of said reflector housing, and at least one fastener opening on the front surface and rear surface;
an LED driver coupled between said at least one exterior groove of two adjacent reflector housings;
a wiring compartment having an internal cavity, including at least one fastener opening that aligns with said at least one fastener opening on said front surface of said reflector housing;
at least one fastener that is coupled from the internal cavity of said wiring compartment through said aligned at least one fastener opening on said front surface of said reflector housing and said wiring compartment; and
a multichannel printed circuit board with at least two rows of LED chips arranged on said printed circuit board, said printed circuit board positioned in said reflector housings.

19. The LED growth light of claim 18, including a distribution hub positioned within said wiring compartment, said distribution hub receiving power from said LED driver and providing power to said rows of LED chips.

20. The LED growth light of claim 19, wherein said distribution hub is suspended within said wiring compartment.

* * * * *